United States Patent
Otsuka

(10) Patent No.: US 10,577,028 B2
(45) Date of Patent: Mar. 3, 2020

(54) AUTOMOBILE MEMBER

(71) Applicant: NIPPON STEEL & SUMITOMO METAL CORPORATION, Tokyo (JP)

(72) Inventor: Kenichiro Otsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/075,078

(22) PCT Filed: Feb. 17, 2017

(86) PCT No.: PCT/JP2017/005904
§ 371 (c)(1),
(2) Date: Aug. 2, 2018

(87) PCT Pub. No.: WO2017/142062
PCT Pub. Date: Aug. 24, 2017

(65) Prior Publication Data
US 2019/0039653 A1  Feb. 7, 2019

(30) Foreign Application Priority Data

Feb. 19, 2016 (JP) ................. 2016-030224

(51) Int. Cl.
*B62D 27/02* (2006.01)
*B62D 21/15* (2006.01)
(Continued)

(52) U.S. Cl.
CPC ......... *B62D 27/023* (2013.01); *B62D 21/152* (2013.01); *B62D 21/157* (2013.01);
(Continued)

(58) Field of Classification Search
CPC .. B62D 21/152; B62D 21/157; B62D 27/023; B62D 25/025; B62D 25/2027; B62D 25/00; B62D 25/20
(Continued)

(56) References Cited

U.S. PATENT DOCUMENTS 4,493,506 A    1/1985   Alexander
5,370,438 A *  12/1994  Mori ................. B62D 25/02
                                                 296/203.02
(Continued)

FOREIGN PATENT DOCUMENTS

DE    102013222016 A1   12/2014
JP    58-188268 U       12/1983
(Continued)

OTHER PUBLICATIONS

International Search Report for PCT/JP2017/005904 dated Apr. 4, 2017.
(Continued)

*Primary Examiner* — Dennis H Pedder
(74) *Attorney, Agent, or Firm* — Birch, Stewart, Kolasch & Birch, LLP

(57) ABSTRACT

Provided is an automobile member including a hat-shaped first member that has a first flange, a second flange, a first wall portion erected from the first flange, a second wall portion erected from the second flange, and a web connecting the first and second wall portions to each other; a second member that is spot-joined to the first and second flanges; a first joining plate that is joined to inner wall surfaces of the first wall portion and the second member; and a second joining plate that is joined to inner wall surfaces of the second wall portion and the second member.

12 Claims, 23 Drawing Sheets

(51) Int. Cl.
*B62D 25/02* (2006.01)
*B62D 25/20* (2006.01)
*B62D 29/00* (2006.01)

(52) U.S. Cl.
CPC ........ *B62D 25/025* (2013.01); *B62D 25/2027* (2013.01); *B62D 29/005* (2013.01)

(58) Field of Classification Search
USPC ............. 296/203.01–203.04, 29, 30, 187.09, 296/187.1, 205, 209; 219/617
See application file for complete search history.

(56) References Cited

U.S. PATENT DOCUMENTS

| | | | | |
|---|---|---|---|---|
| 8,029,050 | B2* | 10/2011 | Tamakoshi | B62D 21/152 296/193.06 |
| 8,702,160 | B2* | 4/2014 | Kurogi | B62D 25/025 296/205 |
| 2004/0183340 | A1 | 9/2004 | Tomita | |
| 2013/0049405 | A1* | 2/2013 | Kurogi | B62D 25/04 296/203.01 |
| 2014/0217777 | A1* | 8/2014 | Tanaka | B62D 25/20 296/187.09 |

FOREIGN PATENT DOCUMENTS

| | | |
|---|---|---|
| JP | 59-182472 U | 12/1984 |
| JP | 1-136008 U | 9/1989 |
| JP | 6-135355 A | 5/1994 |
| JP | 9-295160 A | 11/1997 |
| JP | 2004-276788 A | 10/2004 |
| JP | 2006-142917 A | 6/2006 |
| JP | 2008-290681 A | 12/2008 |
| JP | 2010-143477 A | 7/2010 |
| JP | 2014-40209 A | 3/2014 |
| KR | 10-2013009649 A | 8/2013 |
| RU | 2544248 C1 | 3/2015 |
| RU | 2545143 C1 | 3/2015 |

OTHER PUBLICATIONS

Written Opinion of the International Searching Authority for PCT/JP2017/005904 (PCT/ISA/237) dated Apr. 4, 2017.
Russian Decision to Grant and Search Report for Russian Application No. 2018129856, dated May 28, 2019, with English translation.
Extended European Search Report, dated Sep. 16, 2019, for corresponding European Application No. 177533171.1.
Korean Office Action, dated Nov. 29, 2019, for Korean Application No. 10-2018-7023263, along with an Engiish transiation.

* cited by examiner

AUTOMOBILE MEMBER

TECHNICAL FIELD OF THE INVENTION

The present invention relates to an automobile member.
Priority is claimed on Japanese Patent Application No. 2016-030224, filed on Feb. 19, 2016, the content of which is incorporated herein by reference.

RELATED ART

Most of body shells of vehicle bodies of automobiles having a so-called monocoque structure include a platform, left and right body sides, and an engine compartment provided in a front part of the body shell. The platform has a floor panel. The left and right body sides are mounted on both sides of the platform. The engine compartment has a frontside member as its constituent member.

The body side has an A pillar, a B pillar, a roof rail side, and a side sill (kicker). The roof rail side is welded to an upper end portion of each of the A pillar and the B pillar. As welding for automobile members, resistance spot welding (which will hereinafter be abbreviated to spot welding), laser welding, and the like are mainly used. The side sill is welded to a lower end portion of each of the A pillar and the B pillar, and a front end portion of a rear wheel housing outer.

Generally, a side sill includes a side sill inner panel disposed toward an inner side of a vehicle and a side sill outer panel disposed toward an outer side of the vehicle. Each of the side sill inner panel and the side sill outer panel is a member having a hat-like cross-sectional shape and having a web, a first flange, a second flange, a first wall portion connected to a location between the web and the first flange, and a second wall portion connected to a location between the web and the second flange.

Then, the first flange of the side sill outer panel and the first flange of the side sill inner panel are welded to each other through spot welding. In addition, the second flange of the side sill outer panel and the second flange of the side sill inner panel are welded to each other through spot welding. Accordingly, an integrated side sill having a hollow rectangular cross section is manufactured. That is, a side sill manufactured in this way is a long hollow cylindrical body which is internally provided with an enclosed space having a rectangular cross section.

The side sill is welded to the floor panel through spot welding via upward flanges formed on both sides of a front floor panel. While a vehicle is traveling, deflection caused by elastic deformation of the floor panel is limited by the side sill. In this way, the side sill applies desired bending rigidity and torsional rigidity to the body shell. Moreover, at the time of a collision of the vehicle, the side sill also plays a role of being distorted due to an input impact load and absorbing impact energy.

A side sill is an automobile member which mainly absorbs impact energy by causing so-called three-point bending distortion at the time of a side collision. Therefore, in the related art, side sills have been designed and developed while a main design target is set on enhancement of an impact energy absorption amount (EA) with respect to three-point bending distortion.

Meanwhile, in recent years, in order to further improve the collision safety performance of vehicles, head-on collision tests or rear collision tests postulating a small overlap impact (SOI) begin to be employed. In a small overlap head-on collision test, a vehicle is caused to travel at a speed of 64 km/h and to collide with a fixed barrier such that a portion of 25% of the overall vehicle width in a front end portion of the vehicle hits the fixed barrier.

In such a small overlap head-on collision, since the outer side of an impact absorption structure (for example, a frontside member) provided in a front portion of the vehicle collides with the fixed barrier, it is difficult for the impact absorption structure in the front portion of the vehicle to sufficiently absorb impact energy.

However, as a result of the small overlap head-on collision test, it has been ascertained that axial collapse distortion occurs in a side sill at the time of a collision so that impact energy is absorbed by the side sill. Therefore, from a viewpoint of improving the collision safety performance of vehicles, side sills have recently been required to have an enhanced impact energy absorption amount with respect to two different distortion modes, such as three-point bending distortion and axial collapse distortion.

Incidentally, at the time of a collision entailing axial collapse distortion, there are cases where early fractures (spot fractures) are generated in the side sill starting from a weld between the side sill and a lower A pillar, a weld between the side sill and a B pillar, and a weld between the side sill and a wheel house outer. In this case, it is assumed that the impact energy absorption amount of the side sill through axial collapse distortion decreases due to the spot fractures.

A spot fracture indicates a phenomenon in which a plurality of spot-welding portions being present in a member (for example, a side sill), that is, a plurality of melted and solidified portions (hereinafter, will also be referred to as "nuggets") formed through spot welding are fractured. For example, sometimes a plurality of nuggets present in the side sill are sequentially fractured in order closer to an end portion (end portion to which an impact load is input) in a longitudinal direction and the side sill inner panel peels from the side sill outer panel.

A similar spot fracture is generated in the frontside member as well. Generally, a frontside member includes a hat-shaped panel disposed toward an inner side of a vehicle, and a flat sheet-shaped closing plate disposed toward an outer side of the vehicle. The closing plate is welded to a pair of flanges (first flange and second flange) of the hat-shaped panel through spot welding, and then an integrated frontside member having a hollow rectangular cross section is manufactured. That is, similar to the side sill described above, a frontside member manufactured in this way is a long hollow cylindrical body which is internally provided with an enclosed space having a rectangular cross section.

The frontside member is disposed inside the engine compartment and plays a role of applying desired bending rigidity and torsional rigidity to the body shell and supporting heavy elements such as an engine and important components such as a suspension. In addition, at the time of a head-on collision of a vehicle, the frontside member also plays a role of causing bending distortion due to an impact load input via a front crash box disposed in the front end portion and absorbing collision energy. However, at the time of a head-on collision, there are cases where a plurality of spot-welding portions (nuggets) present in the frontside member are sequentially fractured in order closer to an end portion (end portion to which an impact load is input) of the frontside member in the longitudinal direction and the closing plate peels from the hat-shaped panel. It is assumed that the impact energy absorption amount of the frontside member decreases due to such spot fractures.

Here, the following Patent Documents 1 and 2 disclose an automobile member having a structure which can effectively absorb impact energy when an impact load of a head-on collision is input. The automobile member disclosed in Patent Document 1 has a structure in which the position of a joining flange in a width direction changes along its longitudinal direction. In addition, the automobile member disclosed in Patent Document 2 has a structure in which a bent location is provided along its longitudinal direction and the cross-sectional shape including a flange changes along the longitudinal direction.

In addition, as an example in the related art, the following Patent Document 3 discloses a closed cross-sectional member to which a single bulkhead is internally welded as a reinforcing member.

In addition, the following Patent Document 4 discloses a joining structure member in which a single reinforcing plate is installed in a manner of straddling butting parts of two, three, or more constituent members forming the closed cross-sectional joining structure member.

PRIOR ART DOCUMENT

Patent Document

[Patent Document 1] Japanese Unexamined Patent Application, First Publication No. H6-135355
[Patent Document 2] Japanese Unexamined Patent Application, First Publication No. 2014-40209
[Patent Document 3] Japanese Unexamined Utility Model Application, First Publication No. S59-182472
[Patent Document 4] Japanese Unexamined Patent Application, First Publication No. H9-295160

DISCLOSURE OF THE INVENTION

Problems to be Solved by the Invention

However, in the structures of automobile members disclosed in Patent Documents 1 and 2, the shapes of a hat-shaped panel and a closing plate become very complicated. Therefore, when the members are manufactured through press forming, forming defects such as cracks and wrinkles are likely to occur. As a result, there is concern that a manufacturing yield of the automobile member decreases.

In addition, in a closed cross-sectional member disclosed in Patent Document 3 as an example in the related art, since a single bulkhead is installed inside, in a case where the above-described axial collapse distortion occurs, for example, the bulkhead cannot be distorted while following the distortion of two overlapping portions between an outer sheet and an inner sheet. As a result, a joint portion between the bulkhead and the outer sheet, and a joint portion between the bulkhead and the inner sheet are likely to be fractured. Therefore, it is difficult to limit a decrease of an impact energy absorption amount. In addition, due to a reason similar to that described above, even in a joining structure member disclosed in Patent Document 4, in a case where the above-described axial collapse distortion occurs, a joint portion between a reinforcing plate and the joining structure member having a closed cross section is likely to be fractured. Therefore, it is difficult to limit a decrease of the impact energy absorption amount.

The present invention has been made in consideration of the foregoing circumstances, and an object thereof is to provide an automobile member which can be manufactured without decreasing a manufacturing yield and can limit a decrease of an impact energy absorption amount caused by a spot fracture.

Means for Solving the Problem

In order to solve the above-described problems, the present invention employs the followings.

(1) According to an aspect of the present invention, there is provided an automobile member which is long in one direction and of which a cross section perpendicular to a longitudinal direction is a hollow cross section. The automobile member includes a hat-shaped first member that has a first flange, a second flange, a first wall portion erected from the first flange, a second wall portion erected from the second flange, and a web connecting the first wall portion and the second wall portion to each other; a second member that is spot-joined to the first flange and the second flange; a first joining plate that is joined to an inner wall surface of the first wall portion and an inner wall surface of the second member; and a second joining plate that is joined to an inner wall surface of the second wall portion and an inner wall surface of the second member. The first flange and the second member are joined to each other via a plurality of first melted and solidified portions formed along the longitudinal direction. The first joining plate and the inner wall surface of the first wall portion are joined to each other via a second melted and solidified portion. The first joining plate and the inner wall surface of the second member are joined to each other via a third melted and solidified portion. At least a part of the second melted and solidified portion and at least a part of the third melted and solidified portion are positioned in a region between two first melted and solidified portions adjacent to each other in the longitudinal direction.

The above-described spot-joining conceptually includes spot welding which is resistance welding; laser welding in which the maximum diameter of a circular weld, an oval weld, an elliptical weld, a C-shaped weld, or a multi-circular weld is 15 mm or smaller; adhesive joining in which the maximum diameter of a circular bonding portion, an oval bonding portion, an elliptical bonding portion, a C-shaped bonding portion, or a multi-circular bonding portion is 15 mm or smaller; or arc welding in which the maximum diameter of a circular weld, an oval weld, an elliptical weld, a C-shaped weld, or a multi-circular weld is 15 mm or smaller.

(2) In the aspect according to (1), the second melted and solidified portion and the third melted and solidified portion may be formed in a spot shape.

(3) In the aspect according to (2), in the longitudinal direction, a position of the second melted and solidified portion and a position of the third melted and solidified portion may be the same as each other.

(4) In the aspect according to (3), when the shortest distance between two first melted and solidified portions adjacent to each other in the longitudinal direction is Lf1, the second melted and solidified portion and the third melted and solidified portion may be disposed in a region between a position separated from a middle point between the two first melted and solidified portions adjacent to each other to one side in the longitudinal direction by 0.8×Lf1/2 and a position separated from the middle point to the other side in the longitudinal direction by 0.8×Lf1/2.

(5) In the aspect according to (1), the second melted and solidified portion and the third melted and solidified portion may be formed in a bead shape.

(6) In the aspect according to any one of (1) to (5) may have a configuration as follows: the second flange and the second member are joined to each other via a plurality of fourth melted and solidified portions formed along the longitudinal direction; the second joining plate and the inner wall surface of the second wall portion are joined to each other via a fifth melted and solidified portion; the second joining plate and the inner wall surface of the second member are joined to each other via a sixth melted and solidified portion; and at least a part of the fifth melted and solidified portion and at least a part of the sixth melted and solidified portion are positioned in a region between two fourth melted and solidified portions adjacent to each other in the longitudinal direction.

(7) In the aspect according to (6), in the longitudinal direction, a position of the fifth melted and solidified portion and a position of the sixth melted and solidified portion may be the same as each other.

(8) In the aspect according to (7), when the shortest distance between two fourth melted and solidified portions adjacent to each other in the longitudinal direction is Lf2, the fifth melted and solidified portion and the sixth melted and solidified portion may be disposed in a region between a position separated from a middle point between the two fourth melted and solidified portions adjacent to each other to one side in the longitudinal direction by 0.8×Lf2/2 and a position separated from the middle point to the other side in the longitudinal direction by 0.8×Lf2/2.

(9) In the aspect according to (6), the fifth melted and solidified portion and the sixth melted and solidified portion may be formed in a bead shape.

(10) In the aspect according to any one of (1) to (9) may have a configuration as follows: the second member is a hat-shaped member having a first flange, a second flange, a first wall portion erected from the first flange, a second wall portion erected from the second flange, and a web connecting the first wall portion and the second wall portion to each other; the first flange of the first member and the first flange of the second member are spot-joined to each other, and the second flange of the first member and the second flange of the second member are spot-joined to each other; a width WL (mm) of the first wall portion of the first member and a width WS (mm) of the first wall portion of the second member satisfy the following Expression (a); the first joining plate is joined to the first wall portion of the first member and the first wall portion of the second member; and the second joining plate is joined to the second wall portion of the first member and the second wall portion of the second member.

$$0 < WS/WL < 0.8 \qquad \text{Expression (a)}$$

(11) In the aspect according to any one of (1) to (9) may have a configuration as follows: the second member is a rectangular flat sheet extending in the longitudinal direction and is divided into a first flange joint portion, a second flange joint portion, and a central joint portion between the first flange joint portion and the second flange joint portion along a width direction of the second member; the first flange joint portion of the second member and the first flange of the first member are spot-joined to each other, and the second flange joint portion of the second member and the second flange of the first member are spot-joined to each other; the first joining plate is a sheet material having an L-shaped cross section and is joined to the first wall portion of the first member and the central joint portion of the second member; and the second joining plate is a sheet material having an L-shaped cross section and is joined to the second wall portion of the first member and the central joint portion of the second member.

(12) In the aspect according to any one of (1) to (11), the first joining plate and the second joining plate may extend from one end portion toward the other end portion of the automobile member in the longitudinal direction over a length ranging from 100 mm to 600 mm.

EFFECTS OF THE INVENTION

According to the aspect of the present invention, the first joining plate and the second joining plate are joined to particular locations on the inner wall surfaces of the automobile member, so that when an impact load entailing axial collapse distortion is input to the automobile member, it is possible to limit spot fractures generated in order closer to an end portion to which the impact load is input. That is, according to the aspect of the present invention, since there is no need for the hat-shaped first member and the second member, which is spot-joined thereto, constituting the automobile member to be press-formed into a complicated shape, it is possible to provide an automobile member which can be manufactured without decreasing a manufacturing yield and can limit a decrease of an impact energy absorption amount caused by a spot fracture.

EMBODIMENTS OF THE INVENTION

Hereinafter, each of embodiments and modification examples of the present invention will be described in detail with reference to the drawings. In this specification and the drawings, the same reference signs are applied to constituent elements having substantially the same functional configuration, and a duplicated description thereof will be omitted.

[First Embodiment]

Figure 1A:
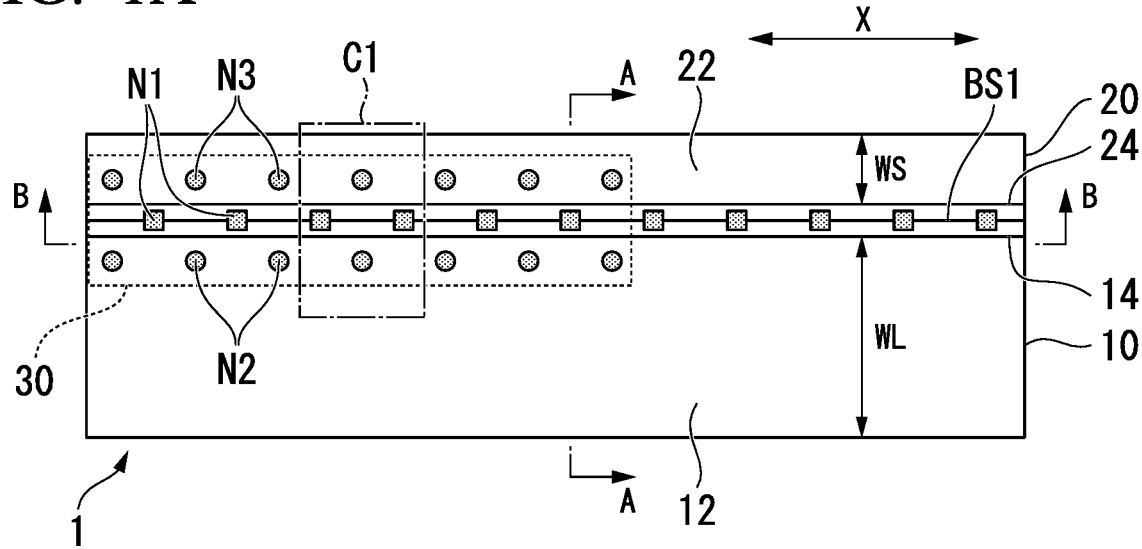
FIG. 1A is a top view showing a side sill according to a first embodiment of the present invention.
Figure 1B:
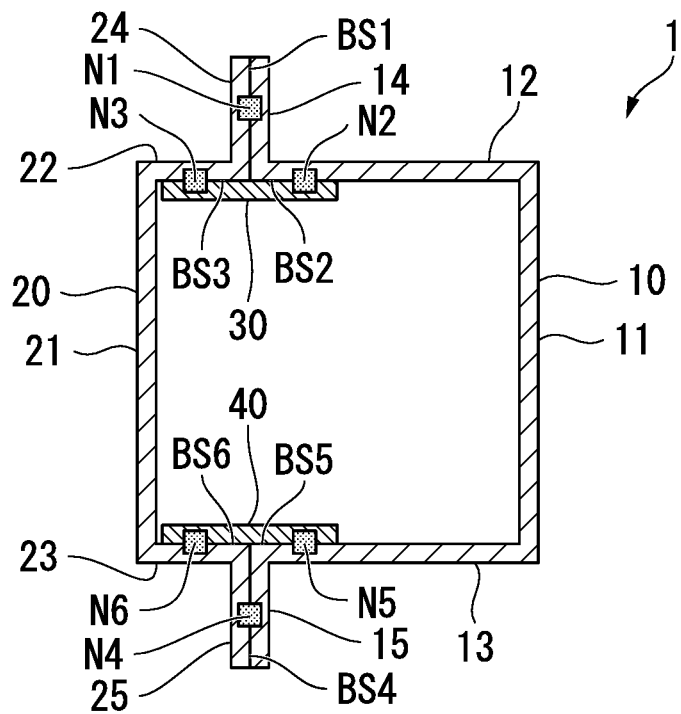
FIG. 1B is a cross-sectional view taken along line A-A in FIG. 1A.
Figure 1C:
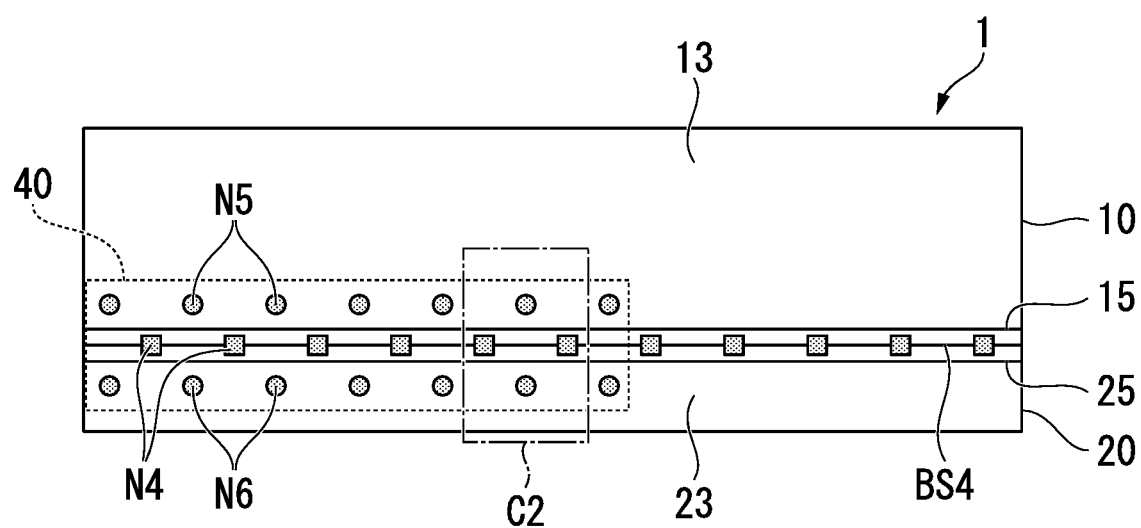
FIG. 1C is a bottom view showing the side sill.

First, a first embodiment of the present invention will be described. In the present embodiment, a side sill which is a frame member of a vehicle body of an automobile will be exemplified as an automobile member according to the present invention. FIGS. 1A to 1C are views showing a side sill 1 according to the present embodiment. FIG. 1A is a top view, FIG. 1B is a cross-sectional view taken along line A-A in FIG. 1A, and FIG. 1C is a bottom view.

In FIG. 1B which is a cross-sectional view taken along line A-A in FIG. 1A, a second melted and solidified portion N2, a third melted and solidified portion N3, a fifth melted and solidified portion N5, and a sixth melted and solidified portion N6 (which will be described below) ought not to come into sight. However, for a better understanding of a disposing relationship among the melted and solidified portions (nuggets) in a cross section, in FIG. 1B, the melted and solidified portions N2, N3, N5, and N6 are indicated.

In addition, in FIG. 1A which is a top view of the side sill 1, a first melted and solidified portion N1, the second melted and solidified portion N2, and the third melted and solidified portion N3 ought not to come into sight. However, for a better understanding of a disposing relationship among the melted and solidified portions (nuggets) when the side sill 1 is seen from an upper side, in FIG. 1A, each of the melted and solidified portions N1, N2, and N3 is indicated.

In addition, in FIG. 1C which is a bottom view of the side sill 1, a fourth melted and solidified portion N4, the fifth melted and solidified portion N5, and the sixth melted and solidified portion N6 ought not to come into sight. However, for a better understanding of a disposing relationship among the melted and solidified portions (nuggets) when the side sill 1 is seen from a lower side, in FIG. 1C, each of the melted and solidified portions N4, N5, and N6 is indicated.

As shown in FIGS. 1A to 1C, the side sill 1 is a long hollow cylindrical body which is internally provided with an enclosed space having a rectangular cross section. That is, in the side sill 1, a cross section perpendicular to a longitudinal direction is a hollow cross section. The side sill 1 includes a side sill outer panel 10 (first member) which is disposed toward an outer side of a vehicle, a side sill inner panel 20 (second member) which is disposed toward an inner side of the vehicle, a first joint plate 30 (first joining plate), and a second joint plate 40 (second joining plate).

The side sill outer panel 10 is a hat-shaped steel sheet obtained by press-forming a high tensile strength steel sheet into a hat shape. The side sill outer panel 10 includes a pair of flanges (first flange 14 and second flange 15) which are parallel to each other, a pair of wall portions (first wall portion 12 and second wall portion 13) which are continuously erected from the pair of flanges, and a web 11 which connects the pair of wall portions to each other and is parallel to the pair of flanges. The web 11, the first wall portion 12, the second wall portion 13, the first flange 14, and the second flange 15 are rectangularly flat portions extending along a longitudinal direction X of the side sill 1.

The first wall portion 12 is erected perpendicularly from one end edge in a short direction of the first flange 14 such that the short direction of the first flange 14 and a short direction of the first wall portion 12 are orthogonal to each other. In addition, the second wall portion 13 is erected perpendicularly from one end edge in a short direction of the second flange 15 such that the short direction of the second flange 15 and a short direction of the second wall portion 13 are orthogonal to each other.

In FIG. 1B, the first wall portion 12 is shown to be continuous at a right angle with respect to the first flange 14. However, the first wall portion 12 is actually continuous via an R-portion having a predetermined radius of curvature (for example, 3 to 15 mm) with respect to the first flange 14. Similarly, in FIG. 1B, the second wall portion 13 is shown to be continuous at a right angle with respect to the second flange 15. However, the second wall portion 13 is actually continuous via the R-portion having a predetermined radius of curvature (for example, 3 to 15 mm) with respect to the second flange 15.

The web 11 connects the first wall portion 12 and the second wall portion 13 to each other such that a short direction of the web 11 is orthogonal to each of the short direction of the first wall portion 12 and the short direction of the second wall portion 13.

In FIG. 1B, the web 11 is shown to be connected at a right angle with respect to the first wall portion 12 and the second wall portion 13. However, the web 11 actually connects the first wall portion 12 and the second wall portion 13 to each other via the R-portion having a predetermined radius of curvature (for example, 3 to 15 mm).

In the side sill outer panel 10 having a configuration as described above, each of the first flange 14 and the second flange 15 faces the outer side of the side sill 1 in a width direction. That is, each of the first flange 14 and the second flange 15 is an outwardly-extending flange. In addition, in the side sill outer panel 10 according to the present embodiment, the width of the first wall portion 12 (length in the short direction) is the same as the width of the second wall portion 13, and the width of the first flange 14 is the same as the width of the second flange 15. The width of the first wall portion 12 may be different from the width of the second wall portion 13, and the width of the first flange 14 may be different from the width of the second flange 15.

The side sill inner panel 20 is a hat-shaped steel sheet obtained by press-forming a high tensile strength steel sheet into a hat shape and includes a pair of flanges (first flange 24 and second flange 25) which are parallel to each other, a pair of wall portions (first wall portion 22 and second wall portion 23) which are continuously erected from the pair of flanges, and a web 21 which connects the pair of wall portions to each other and is parallel to the pair of flanges.

The web 21, the first wall portion 22, the second wall portion 23, the first flange 24, and the second flange 25 are rectangularly flat portions extending along the longitudinal direction X of the side sill 1.

The first wall portion 22 is erected perpendicularly from one end edge in a short direction of the first flange 24 such that a short direction of the first wall portion 22 is orthogonal to the short direction of the first flange 24. In addition, the second wall portion 23 is erected perpendicularly from one end edge in a short direction of the second flange 25 such that a short direction of the second wall portion 23 is orthogonal to the short direction of the second flange 25.

In FIG. 1B, the first wall portion 22 is shown to be continuous at a right angle with respect to the first flange 24. However, the first wall portion 22 is actually continuous via the R-portion having a predetermined radius of curvature (for example, 3 to 15 mm) with respect to the first flange 24. Similarly, in FIG. 1B, the second wall portion 23 is shown to be continuous at a right angle with respect to the second flange 25. However, the second wall portion 23 is actually continuous via the R-portion having a predetermined radius of curvature (for example, 3 to 15 mm) with respect to the second flange 25.

The web 21 connects the first wall portion 22 and the second wall portion 23 to each other such that a short direction of the web 21 is orthogonal to each of the short direction of the first wall portion 22 and the short direction of the second wall portion 23.

In FIG. 1B, the web 21 is shown to be connected at a right angle with respect to the first wall portion 22 and the second wall portion 23. However, the web 21 actually connects the first wall portion 22 and the second wall portion 23 to each other via the R-portion having a predetermined radius of curvature (for example, 3 to 15 mm).

In the side sill inner panel 20 having a configuration as described above, each of the first flange 24 and the second flange 25 faces the outer side of the side sill 1 in the width direction. That is, each of the first flange 24 and the second flange 25 is an outwardly-extending flange. In addition, in the side sill inner panel 20 according to the present embodiment, the width of the first wall portion 22 is the same as the width of the second wall portion 23, and the width of the first flange 24 is the same as the width of the second flange 25. The width of the first wall portion 22 may be different from the width of the second wall portion 23, and the width of the first flange 24 may be different from the width of the second flange 25.

The length and the sheet thickness of the side sill inner panel 20 according to the present embodiment are the same as the length and the sheet thickness of the side sill outer panel 10. The width of the web 21 of the side sill inner panel 20 is the same as the width of the web 11 of the side sill outer panel 10. The width of the first flange 24 of the side sill inner panel 20 is the same as the width of the first flange 14 of the side sill outer panel 10. The sheet thickness of the side sill inner panel 20 and the sheet thickness of the side sill outer panel 10 may be different from each other.

In the side sill 1, the first flange 14 of the side sill outer panel 10 and the first flange 24 of the side sill inner panel 20 are spot-welded to each other in an overlapping state, and the second flange 15 of the side sill outer panel 10 and the second flange 25 of the side sill inner panel 20 are spot-welded to each other in an overlapping state. Since the side sill outer panel 10 and the side sill inner panel 20 are joined to each other in this way, an enclosed space having a rectangular cross section is formed along the longitudinal direction X in the side sill 1. In other words, in the side sill 1, a cross section perpendicular to the longitudinal direction X is a hollow rectangular cross section.

In a case where the side sill outer panel 10 and the side sill inner panel 20 are spot-welded to each other, if the sheet thickness of the sheet thicknesses of the side sill outer panel 10 and the side sill inner panel 20 are significantly different from each other, the heat-sink state depending on contact with a spot-welding electrode cooling the inside becomes different between the side sill outer panel 10 and the side sill inner panel 20. In this case, due to spot welding, a melted and solidified portion may be formed to be biased to a side having a greater sheet thickness, so that there is concern that the quality of a spot-welding portion is degraded. Therefore, from a viewpoint of avoiding degradation of the quality of a spot-welding portion, it is preferable that the sheet thickness of the sheet thicknesses of the side sill outer panel 10 and the side sill inner panel 20 are the same as each other.

In addition, in a case where strength (tensile strength) of strength of the side sill outer panel 10 and the side sill inner panel 20 are different from each other, when axial collapse distortion such as a small overlap occurs, shear distortion occurs in a joint part so that a spot-welding portion is likely to be fractured. Therefore, from the viewpoint described above, it is preferable that strength of strength of the side sill outer panel 10 and the side sill inner panel 20 are the same as each other.

That is, from the two viewpoints described above, it is preferable that the side sill outer panel 10 and the side sill inner panel 20 are formed of the same steel sheet (steel sheet having the same tensile strength and sheet thickness).

The first joint plate 30 is a rectangularly flat steel sheet extending in the longitudinal direction X. The first joint plate 30 is not limited to a steel sheet and need only be formed of a sheet material which can be spot-welded. However, as described above, from a viewpoint of limiting fracture of a spot-welding portion at the time of axial collapse distortion such as a small overlap, it is preferable that strength of the first joint plate 30 is the same as strength of the side sill outer panel 10 and the side sill inner panel 20. In addition, as described above, from a viewpoint of avoiding degradation of the quality of a spot-welding portion, it is preferable that the sheet thickness of the first joint plate 30 is the same as the sheet thicknesses of the side sill outer panel 10 and the side sill inner panel 20.

That is, it is preferable that the first joint plate 30 is formed of the same steel sheet as those forming the side sill outer panel 10 and the side sill inner panel 20.

The first joint plate 30 is spot-welded in a state of abutting on an inner wall surface of the first wall portion 12 of the side sill outer panel 10 and an inner wall surface of the first wall portion 22 of the side sill inner panel 20 and is joined to the inner wall surfaces thereof. In other words, in a case of being seen in the width direction of the side sill 1 (width direction of the flange), the first joint plate 30 is joined to the first wall portion 12 of the side sill outer panel 10 and the first wall portion 22 of the side sill inner panel 20 through spot welding such that a border line between the first flange 14 of the side sill outer panel 10 and the first flange 24 of the side sill inner panel 20 is covered. The first joint plate 30 is in non-contact with the webs 11 and 21. That is, a gap is generated between both end surfaces of the first joint plate 30 in the width direction and the webs 11 and 21.

Here, as described above, since the R-portion having a predetermined radius of curvature (3 to 15 mm) is provided between the wall portions and the webs, in order to weld the first joint plate 30 (flat sheet material) to the wall portion, the first above-described gap is inevitably generated. In addition, the first joint plate 30 is rather a flat sheet material such that the first joint plate 30 is likely to be distorted while following the distortion of the joining location at the time of collision distortion. That is, there is an advantage that fracture of spot welding of the first joint plate 30 is limited by generating the above-described gap.

In the present disclosure, the "inner wall surface" indicates a wall surface facing an internal space of the side sill 1 (in the present embodiment, an enclosed space having a rectangular cross section). The cross-sectional shape of the internal space is determined in accordance with the shape of the side sill 1 and is not limited to a rectangular shape.

The second joint plate 40 is a rectangularly flat steel sheet extending in the longitudinal direction X. The second joint plate 40 is not limited to a steel sheet and needs only be formed of a sheet material which can be spot-welded. However, due to a reason similar to that of the first joint plate 30, it is preferable that the second joint plate 40 is formed of the same steel sheet as those forming the side sill outer panel 10 and the side sill inner panel 20.

The second joint plate 40 is spot-welded in a state of abutting on an inner wall surface of the second wall portion 13 of the side sill outer panel 10 and an inner wall surface of the second wall portion 23 of the side sill inner panel 20 and is joined to the inner wall surfaces thereof. In other words, in a case of being seen in the width direction of the side sill 1, the second joint plate 40 is joined to the second wall portion 13 of the side sill outer panel 10 and the second wall portion 23 of the side sill inner panel 20 through spot welding such that a border line between the second flange 15 of the side sill outer panel 10 and the second flange 25 of the side sill inner panel 20 is covered. The second joint plate 40 is in non-contact with the webs 11 and 21. That is, a gap is generated between both end surfaces of the second joint plate 40 in the width direction and the webs 11 and 21.

As described above, the first joint plate 30 is joined to the inner wall surface of the first wall portion 12 of the side sill outer panel 10 and the inner wall surface of the first wall portion 22 of the side sill inner panel 20. Then, the second joint plate 40 is joined to the inner wall surface of the second wall portion 13 of the side sill outer panel 10 and the inner wall surface of the second wall portion 23 of the side sill inner panel 20. Therefore, the first joint plate 30 and the second joint plate 40 are separated to be in non-contact with each other. Since they are separated to be in non-contact with each other, each of the joint plates can be independently distorted in accordance with the distortion of the joining location (can be distorted while following the distortion of the joining location) at the time of collision distortion. Accordingly, a fracture of spot welding is unlikely to be generated in the joint plate. On the other hand, in a case where if the first joint plate 30 and the second joint plate 40 are integrated, distortion of the first joint plate 30 affects distortion of the second joint plate 40 (stress generated in the first joint plate 30 is transferred to the second joint plate 40), for example. Accordingly, a fracture of spot welding of the first joint plate 30 and the second joint plate 40 is likely to be generated.

As shown in FIGS. 1A and 1B, the side sill outer panel 10 and the side sill inner panel 20 are joined to each other through spot welding. As a result, on a border surface BS1 (overlapping surface) between the first flange 14 of the side sill outer panel 10 and the first flange 24 of the side sill inner panel 20, a plurality of first melted and solidified portions N1 (nuggets) are formed in a spot shape along the longitudinal direction X of the side sill 1. In other words, the first flange 14 and the first flange 24 are joined to each other via the plurality of first melted and solidified portions N1 formed along the longitudinal direction X of the side sill 1.

In addition, the first joint plate 30 and the first wall portion 12 of the side sill outer panel 10 are joined to each other through spot welding. As a result, on a border surface BS2 between the first joint plate 30 and the inner wall surface of the first wall portion 12, a plurality of second melted and solidified portions N2 (nuggets) are formed in a spot shape along the longitudinal direction X of the side sill 1. In other words, the first joint plate 30 and the inner wall surface of the first wall portion 12 are joined to each other via the plurality of second melted and solidified portions N2 formed along the longitudinal direction X of the side sill 1.

Moreover, the first joint plate 30 and the first wall portion 22 of the side sill inner panel 20 are joined to each other through spot welding. As a result, on a border surface BS3 between the first joint plate 30 and the inner wall surface of the first wall portion 22, a plurality of third melted and solidified portions N3 (nuggets) are formed in a spot shape along the longitudinal direction X of the side sill 1. In other words, the first joint plate 30 and the inner wall surface of the first wall portion 22 are joined to each other via the plurality of third melted and solidified portions N3 formed along the longitudinal direction X of the side sill 1.

Meanwhile, as shown in FIGS. 1B and 1C, the side sill outer panel 10 and the side sill inner panel 20 are joined to each other through spot welding. As a result, on a border surface BS4 between the second flange 15 of the side sill outer panel 10 and the second flange 25 of the side sill inner panel 20, a plurality of fourth melted and solidified portions N4 (nuggets) are formed in a spot shape along the longitudinal direction X of the side sill 1. In other words, the second flange 15 and the second flange 25 are joined to each other via the plurality of fourth incited and solidified portions N4 formed along the longitudinal direction X of the side sill 1.

In addition, the second joint plate 40 and the second wall portion 13 of the side sill outer panel 10 are joined to each other through spot welding. As a result, on a border surface BS5 between the second joint plate 40 and the inner wall surface of the second wall portion 13, a plurality of fifth melted and solidified portions N5 (nuggets) are formed in a spot shape along the longitudinal direction X of the side sill 1. In other words, the second joint plate 40 and the inner wall surface of the second wall portion 13 are joined to each other via the plurality of fifth melted and solidified portions N5 formed along the longitudinal direction X of the side sill 1.

Moreover, the second joint plate 40 and the second wall portion 23 of the side sill inner panel 20 are joined to each other through spot welding. As a result, on a border surface BS6 between the second joint plate 40 and the inner wall surface of the second wall portion 23, a plurality of sixth melted and solidified portions N6 (nuggets) are formed in a spot shape along the longitudinal direction X of the side sill 1. In other words, the second joint plate 40 and the inner wall surface of the second wall portion 23 are joined to each other via the plurality of sixth melted and solidified portions N6 formed along the longitudinal direction X of the side sill 1.

Each of the first joint plate 30 and the second joint plate 40 may have a length (overall length in the longitudinal direction X) shorter than those of the side sill outer panel 10 and the side sill inner panel 20, and one end surface thereof in the longitudinal direction X may be flush with one end surface (end portion to which an impact load is input) of the side sill outer panel 10 and the side sill inner panel 20.

The lengths of the first joint plate 30 and the second joint plate 40 may be the same as the lengths of the side sill outer panel 10 and the side sill inner panel 20. However, from a viewpoint of reducing the weight and the manufacturing cost of the side sill 1, it is preferable to have a minimum necessary length. That is, it is preferable that the lengths of the first joint plate 30 and the second joint plate 40 are lengths in accordance with a range in which an impact load entailing axial collapse distortion is propagated inside the side sill 1. For example, it is preferable that the lengths range from 100 mm to 600 mm. In addition, it is preferable that the lengths of the first joint plate 30 and the second joint plate 40 range from 5% to 75% with respect to the overall length of the side sill 1.

In addition, from the viewpoints described above, it is also preferable that the first joint plate 30 and the second joint plate 40 have a minimum necessary width. For example, it is preferable that the width of the first joint plate 30 is a minimum width such that the first joint plate 30 can be spot-welded to the first wall portion 12 and the first wall portion 22. Here, as described above, the R-portion (not shown) having a predetermined radius of curvature is individually provided between the first flange 14 and the first wall portion 12, and between the first flange 24 and the first wall portion 22. The diameter of a main body of the spot-welding electrode used for spot welding is approximately 15 mm. In addition, in consideration of a nugget diameter of a weld, it is necessary that the flange width is approximately 15 mm.

In consideration of those described above, it is preferable that the width dimension of the first joint plate 30 is equal to the sum of the radius (mm) of curvature of the R-portion between the first flange 14 and the first wall portion 12, the radius (mm) of curvature of the R-portion between the first flange 24 and the first wall portion 22, and 30 mm (=15 mm×2) (the same applies to the width of the second joint plate 40).

In addition, when the widths of the first joint plate 30 and the second joint plate 40 are minimized, the first joint plate 30 and the second joint plate 40 are likely to be distorted while following the distortion of the joining location at the time of collision distortion. Therefore, there is an advantage that a fracture of spot welding is unlikely to be generated in the first joint plate 30 and the second joint plate 40.

As shown in FIG. 1A, when the width of the first wall portion 12 of the side sill outer panel 10 (length of the first wall portion 12 in the short direction) is WL (mm) and the width of the first wall portion 22 of the side sill inner panel 20 (length of the first wall portion 22 in the short direction) is WS (mm), it is preferable that the width WL of the first wall portion 12 and the width WS of the first wall portion 22 are set such that the following Expression (1) is satisfied.

$$0 < WS/WL < 0.8 \qquad \text{Expression (1)}$$

In a case where the value obtained by dividing the width WS of the first wall portion 22 of the side sill inner panel 20 by the width WL of the first wall portion 12 of the side sill outer panel 10 ("WS/WL") is smaller than 1.0, the width WS of the first wall portion 22 of the side sill inner panel 20 becomes smaller than the width WL of the first wall portion 12 of the side sill outer panel 10. In this case, the side sill outer panel 10 and the side sill inner panel 20 have mutually asymmetrical hat shapes. Hereinafter, such a structure of the side sill 1 will be called an asymmetrical hat structure.

Reasons for regulating the above-described Expression (1) are as follows, and details will be described with reference to Examples.

Case where the upper limit value for Expression (1) is not satisfied (WS/WL≥0.8): In a case where a load is input to the web 11 of the side sill outer panel 10 of the side sill 1 and three-point bending distortion occurs in the side sill 1, the flange overlapping portion is located close to the web 11, and the flange is likely to be distorted toward the inside of the side sill 1. Therefore, an impact energy absorption amount with respect to three-point bending distortion decreases.

Case where the lower limit value for Expression (1) is not satisfied (WS/WL=0): Since it cannot be dimensionally realized, the side sill 1 cannot have an asymmetrical hat structure. Therefore, the impact energy absorption amount with respect to three-point bending distortion decreases.

Case where Expression (1) is satisfied: In a case where a load is input to the web 11 of the side sill outer panel 10 of the side sill 1 and three-point bending distortion occurs in the side sill 1, the flange overlapping portion is located far from the web 11, so that the flange is unlikely to be distorted toward the inside of the side sill 1. Therefore, the impact energy absorption amount with respect to three-point bending distortion is improved.

As described above, according to the side sill 1 including the first joint plate 30 and the second joint plate 40 and having an asymmetrical hat structure which satisfies the above-described Expression (1), it is possible to enhance the impact energy absorption amount with respect to two different distortion modes, such as axial collapse distortion and three-point bending distortion.

The width WL (mm) of the first wall portion 12 of the side sill outer panel 10 and the width WS (mm) of the first wall portion 22 of the side sill inner panel 20 are set to be equal to or greater than a width at which spot welding can be performed. That is, due to a reason similar to that of the first joint plate 30, the width WL of the first wall portion 12 of the side sill outer panel 10 is set to be equal to or greater than the sum of the radius (mm) of curvature of the R-portion between the first flange 14 and the first wall portion 12, the radius (mm) of curvature of the R-portion between the first wall portion 12 and the web 11, and 15 mm.

As a result of an inspection by the inventors, which will be described in detail with reference to Examples, it has been ascertained that although the impact energy absorption amount with respect to three-point bending distortion can be enhanced in a side sill which does not include the first joint plate 30 and the second joint plate 40 and has an asymmetrical hat structure satisfying the above-described Expression (1) (hereinafter, this side sill will be referred to as a side sill of a comparative example), a spot fracture is likely to be generated when an impact load entailing axial collapse distortion is input under a particular condition, so that an impact energy absorption amount with respect to axial collapse distortion decreases.

That is, in the side sill of Comparative Example, when a head-on collision occurs such that an impact load entailing axial collapse distortion is input first to the side sill outer panel 10, a significant shear force acts on each of the border surface BS1 between the first flanges 14 and 24 and the border surface BS4 between the second flanges 15 and 25, so that spot fractures are generated in order closer to an input end of the impact load due to the shear force (fractures of the first melted and solidified portion N1 and the fourth melted and solidified portion N4).

On the other hand, in the side sill 1 according to the present embodiment, since the first joint plate 30 is joined to the inner wall surfaces of the first wall portions 12 and 22, the first wall portions 12 and 22 are connected to each other via the first joint plate 30, so that the first flanges 14 and 24 can be in a firmly joined state. In addition, since the second joint plate 40 is joined to the inner wall surfaces of the second wall portions 13 and 23, the second wall portions 13 and 23 are connected to each other via the second joint plate 40, so that the second flanges 15 and 25 can be in a firmly joined state. In addition, the independent joining plates (first joint plate 30 and second joint plate 40) separated from each other are used for each joining location. Accordingly, for example, a load input to the first joint plate 30 can be prevented from being transferred to the second joint plate 40. Therefore, since each of the first joint plate 30 and the second joint plate 40 can be distorted while following the distortion of the joining location, spot fracture between the first joint plate 30 and the first wall portions 12 and 22 (fracture of the second melted and solidified portion N2 and the third melted and solidified portion N3), and spot fracture between the second joint plate 40 and the second wall portions 13 and 23 (fracture of the fifth melted and solidified portion N5 and the sixth melted and solidified portion N6) are limited.

Therefore, even if an impact load entailing axial collapse distortion is input first to the side sill outer panel 10, spot fracture can be limited.

As described above, according to the present embodiment, the first joint plate 30 and the second joint plate 40 are joined to particular locations on the inner wall surface of the side sill 1, so that it is possible to limit spot fractures generated in order closer to an end portion to which an impact load entailing axial collapse distortion is input, when the impact load is input to the side sill 1. That is, according to the present embodiment, since there is no need for the side sill outer panel 10 and the side sill inner panel 20, which is spot-welded to the side sill outer panel 10, to be press-formed into a complicated shape, it is possible to provide the side sill 1 which can be manufactured without decreasing a manufacturing yield and can limit a decrease of an impact energy absorption amount caused by a spot fracture.

Moreover, since the side sill 1 according to the present embodiment includes the first joint plate 30 and the second joint plate 40 and has an asymmetrical hat structure satisfying the above-described Expression (1), it is possible to enhance the impact energy absorption amount with respect to two different distortion modes, such as axial collapse distortion and three-point bending distortion.

As described above, an effect of limiting spot fracture can be achieved by joining the first joint plate 30 to the inner wall surfaces of the first wall portions 12 and 22 and joining the second joint plate 40 to the inner wall surfaces of the second wall portions 13 and 23. However, in order to further limit spot fracture, it is preferable to set the positional relationship among the first melted and solidified portion N1, the second melted and solidified portion N2, and the third melted and solidified portion N3, and the positional relationship among the fourth melted and solidified portion N4, the fifth melted and solidified portion N5, and the sixth melted and solidified portion N6 as follows.

Figure 2A:
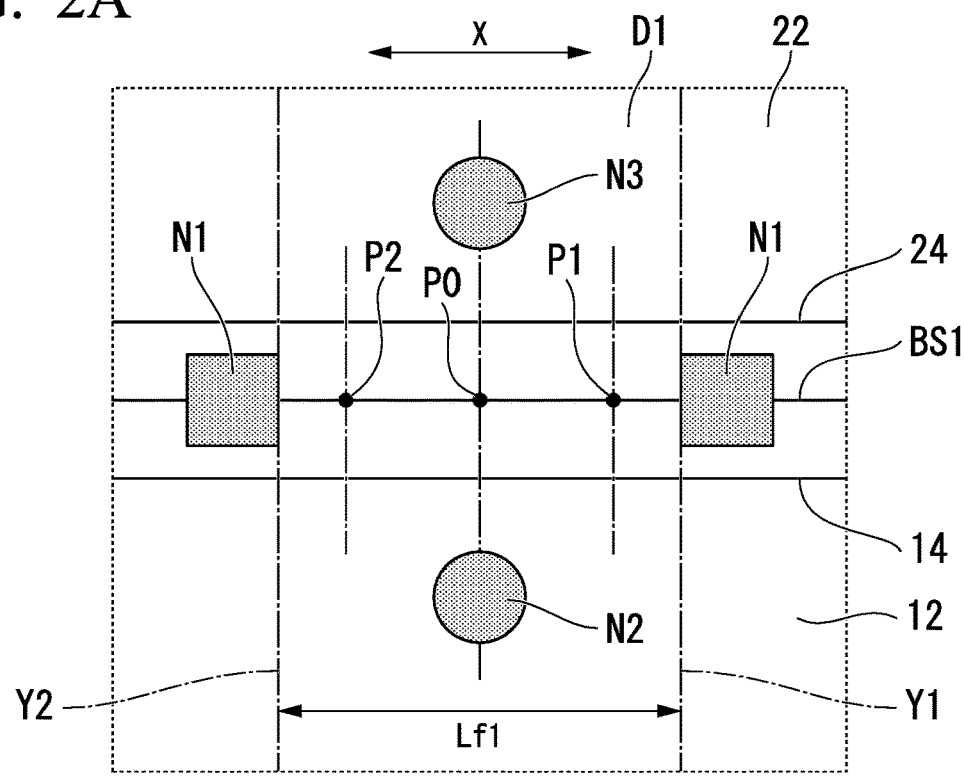
FIG. 2A is an enlarged view of a region indicated with the reference sign C1 in FIG. 1A.

FIG. 2A is an enlarged view of a region C1 shown in FIG. 1A. As shown in FIG. 2A, it is preferable that one second melted and solidified portion N2 and one third melted and solidified portion N3 are disposed in a region D1 of the first wall portions 12 and 22 between two first melted and solidified portions N1 adjacent to each other in the longitudinal direction X of the side sill 1. Here, as shown in FIG. 2A, the region D1 denotes a region interposed between a perpendicular line Y1 and a perpendicular line Y2. The perpendicular line Y1 is a line which passes through the end portion close to the other first melted and solidified portion N1, in both end portions of one of the two first melted and solidified portions N1 adjacent to each other in the longitudinal direction X and is orthogonal to the longitudinal direction X of the first flanges 14 and 24. In addition, the perpendicular line Y2 is a line which passes through the end portion close to the one first melted and solidified portion N1, in both the end portions of the other first melted and solidified portion N1 in the longitudinal direction X and is orthogonal to the longitudinal direction X of the first flanges 14 and 24.

As one of the factors of a fracture of a weld when a load is input to the side sill 1 from an end portion of the side sill 1 along the longitudinal direction X, a material between two welds adjacent to each other is distorted at the time of a collision and stress is applied to the welds. Thus, distortion between welds can be limited by disposing the second melted and solidified portion N2 and the third melted and solidified portion N3 in the region D1. As a result, it is possible to further limit spot fracture.

In order to evenly apply stress caused by distortion at the time of a collision to the second melted and solidified portion N2 and the third melted and solidified portion N3 (that is, in order to reduce stress to be applied), it is preferable that the position of the second melted and solidified portion N2 in the longitudinal direction X and the position of the third melted and solidified portion N3 in the longitudinal direction X are the same as each other.

Here, as shown in FIG. 2A, when the distance between the perpendicular line Y1 and the perpendicular line Y2 (shortest distance between two first melted and solidified portions N1 adjacent to each other in the longitudinal direction X) is Lf1, it is more preferable that one second melted and solidified portion N2 and one third melted and solidified portion N3 are disposed in a region of the first wall portions 12 and 22 between a position P1 separated from a middle point P0 between the two first melted and solidified portions N1 adjacent to each other to one side in the longitudinal direction X by $0.8 \times Lf1/2$ and a position P2 separated from the middle point P0 to the other side in the longitudinal direction X by $0.8 \times Lf1/2$.

At least a part of the second melted and solidified portion N2 and at least a part of the third melted and solidified portion N3 may be positioned in the region D1 of the first wall portions 12 and 22 between the two first melted and solidified portions N1 adjacent to each other the longitudinal direction X. In addition, the positions of the second melted and solidified portion N2 and the third melted and solidified portion N3 in the longitudinal direction X may coincide with the position of the first melted and solidified portion N1 in the longitudinal direction X.

Figure 2B:
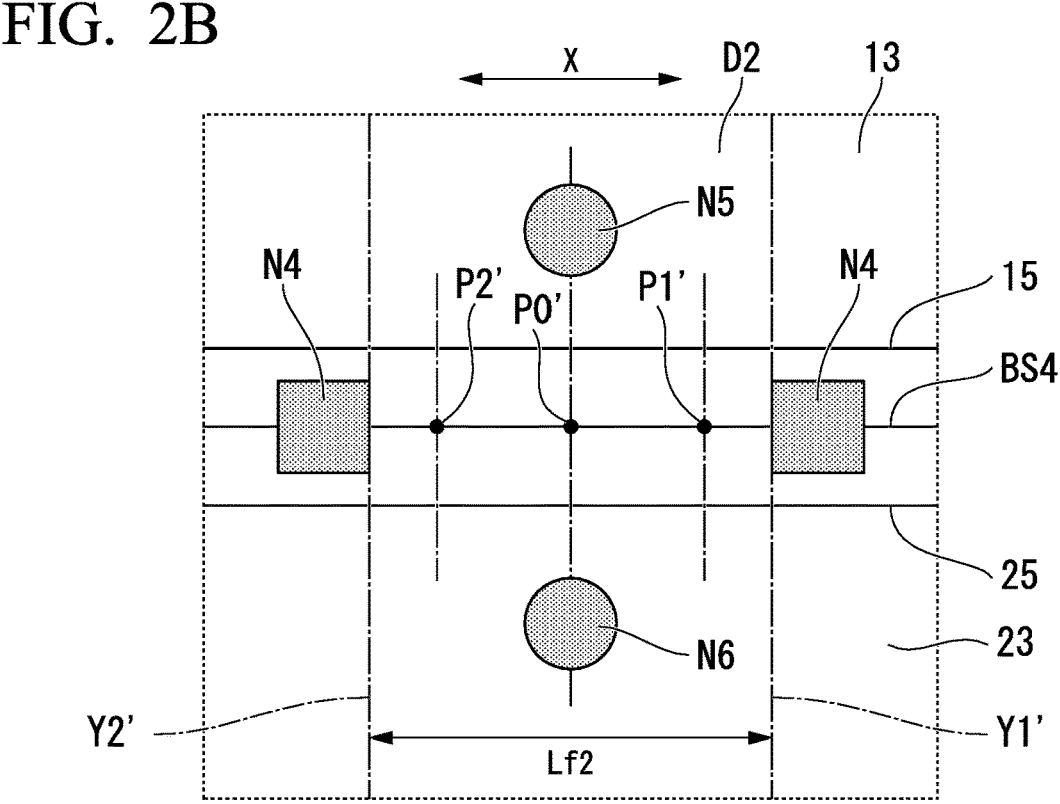
FIG. 2B is an enlarged view of a region indicated with the reference sign C2 in FIG. 1C.

FIG. 2B is an enlarged view of a region C2 shown in FIG. 1C. As shown in FIG. 2B, due to a reason similar to the reason described in FIG. 2A, it is preferable that one fifth melted and solidified portion N5 and one sixth melted and solidified portion N6 are disposed in a region D2 of the second wall portions 13 and 23 between two fourth melted and solidified portions N4 adjacent to each other in the longitudinal direction X of the side sill 1. Here, similar to FIG. 2A, the region D2 denotes a region interposed between a perpendicular line Y1' and a perpendicular line Y2'. The perpendicular line Y1' is a line which passes through the end portion close to the other fourth melted and solidified portion N4, in both end portions of one of the two fourth melted and solidified portions N4 adjacent to each other in the longitudinal direction X and is orthogonal to the longitudinal direction X of the second flanges 15 and 25. In addition, the perpendicular line Y2' is a line which passes through the end portion close to the one fourth melted and solidified portion N4, in both the end portions of the other fourth melted and solidified portion N4 in the longitudinal direction X and is orthogonal to the longitudinal direction X of the second flanges 15 and 25.

It is preferable that the position of the fifth melted and solidified portion N5 in the longitudinal direction X and the position of the sixth melted and solidified portion N6 in the longitudinal direction X are the same as each other.

Here, as shown in FIG. 2B, when the distance between the perpendicular line Y1' and the perpendicular line Y2' (shortest distance between two fourth melted and solidified portions N4 adjacent to each other in the longitudinal direction X) is Lf2, it is more preferable that one fifth melted and solidified portion N5 and one sixth melted and solidified portion N6 are disposed in a region of the second wall portions 13 and 23 between a position P1' separated from a middle point P0' between the two fourth melted and solidified portions N4 adjacent to each other to one side in the longitudinal direction X by 0.8×Lf2/2 and a position P2' separated from the middle point P0' to the other side in the longitudinal direction X by 0.8×Lf2/2.

As described above, a shear force acting on the border surfaces BS1 and BS4 can be more effectively reduced by optimizing the positional relationship among the first melted and solidified portion N1, the second melted and solidified portion N2, and the third melted and solidified portion N3, and the positional relationship among the fourth melted and solidified portion N4, the fifth melted and solidified portion N5, and the sixth melted and solidified portion N6. As a result, it is possible to further limit generation of a spot fracture.

At least a part of the fifth melted and solidified portion N5 and at least a part of the sixth melted and solidified portion N6 may be positioned in the region D2 of the second wall portions 13 and 23 between the two fourth melted and solidified portions N4 adjacent to each other in the longitudinal direction X. In addition, the positions of the fifth melted and solidified portion N5 and the sixth melted and solidified portion N6 in the longitudinal direction X may coincide with the position of the fourth melted and solidified portion N4 in the longitudinal direction X.

In addition, although a case where the constituent members are joined to each other through spot welding is exemplified for the side sill 1, the constituent members need only be spot-joined to each other.

Here, spot-joining conceptually includes spot welding which is resistance welding; laser welding in which the maximum diameter of a circular weld, an oval weld, an elliptical weld, a C-shaped weld, or a multi-circular weld is 15 mm or smaller; adhesive joining in which the maximum diameter of a circular bonding portion, an oval bonding portion, an elliptical bonding portion, a C-shaped bonding portion, or a multi-circular bonding portion is 15 mm or smaller; or arc welding in which the maximum diameter of a circular weld, an oval weld, an elliptical weld, a C-shaped weld, or a multi-circular weld is 15 mm or smaller.

[Modification Example of First Embodiment]

Figure 3:
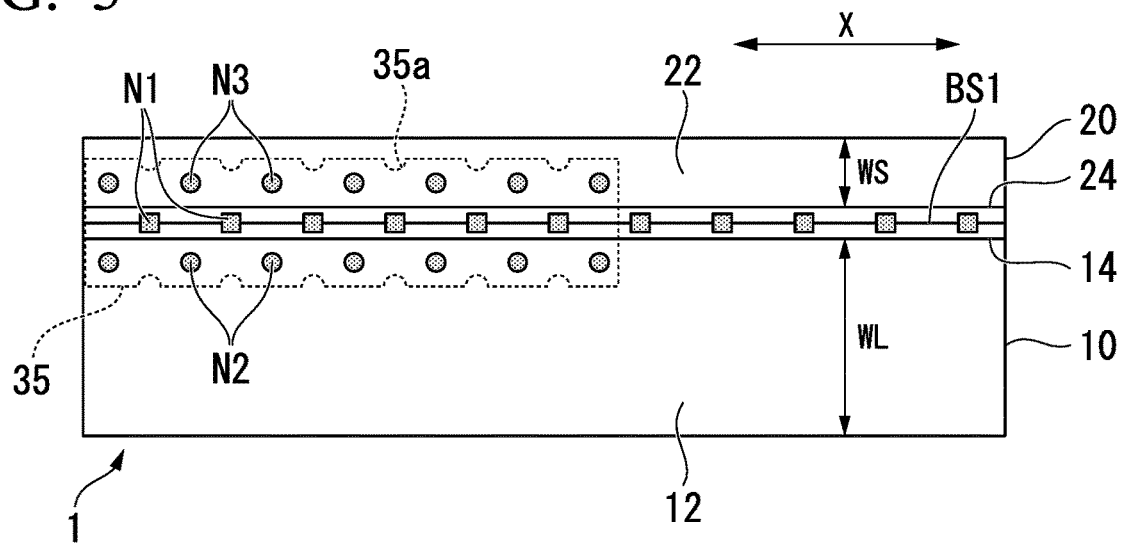
FIG. 3 is a top view showing a first modification example of the side sill.

FIG. 3 is a top view showing the side sill 1, and the view shows a first modification example of the present embodiment. As shown in FIG. 1A, the present embodiment has described a case where the rectangular first joint plate 30 is used. On the other hand, as shown in FIG. 3, a first joint plate 35 in which a plurality of arc-shaped cutout parts 35a are formed at intervals along the longitudinal direction X may be used. According to this configuration, the first joint plate can be reduced in weight. In addition, as shown in FIG. 3, the first joint plate 35 is disposed such that the cutout parts 35a face the first melted and solidified portion N1 in a case of a top view. Accordingly, the first joint plate 35 is likely to be distorted while following axial collapse distortion of the side sill outer panel 10 and the side sill inner panel 20. Therefore, it is possible to further limit a fracture of spot welding.

The shape of the cutout part 35a is not limited to an arc and may be a rectangle or a triangle. However, since the first joint plate 35 is likely to be distorted while following the side sill 1, it is preferable that the cutout parts 35a has a shape tapered toward the inner side of the first joint plate 35 in the width direction.

Figure 4:
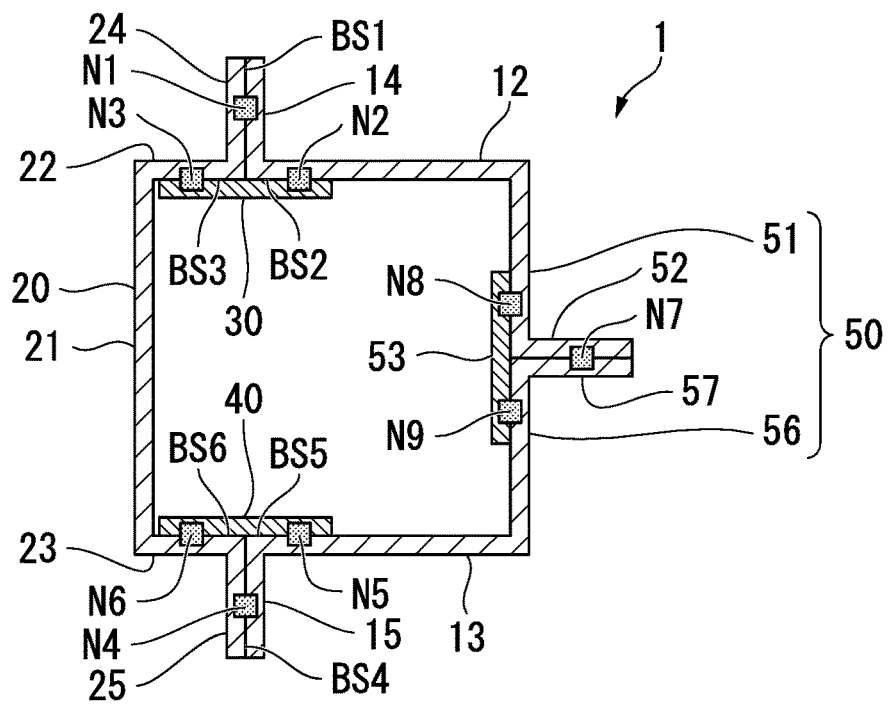
FIG. 4 is a cross-sectional view taken along line A-A in FIG. 1A, and the view shows a second modification example of the side sill.

FIG. 4 is a cross-sectional view taken along line A-A in FIG. 1A, and the view shows a second modification example of the present embodiment. As shown in FIG. 1B, the present embodiment has described a case where the hat-shaped side sill outer panel 10, which is manufactured by bending one steel sheet through press forming, is used in the side sill 1. On the other hand, as shown in FIG. 4, a side sill outer panel 50 constituted of two steel sheets 51 and 56 bent through press forming may be used.

As shown in FIG. 4, the side sill outer panel 50 can be manufactured by causing a flange 52 of the steel sheet 51 and a flange 57 of the steel sheet 56 to overlap and to be spot-welded to each other. Therefore, in the side sill outer panel 50, a seventh melted and solidified portion N7 is formed between the flange 52 of the steel sheet 51 and the flange 57 of the steel sheet 56. Similar to the case of the present embodiment, a third joint plate 53 is joined to the side sill outer panel 50 through spot welding such that a border line between the flange 52 and the flange 57 is covered. Accordingly, on an overlapping surface of the third joint plate 53 and the side sill outer panel 50, an eighth melted and solidified portion N8 and a ninth melted and solidified portion N9 are formed.

According to the second modification example of the present embodiment, even in a case where the side sill outer panel is constituted of two steel sheets, it is possible to limit a fracture of the seventh melted and solidified portion N7.

In FIG. 4, the second melted and solidified portion N2, the third melted and solidified portion N3, the fifth melted and solidified portion N5, the sixth melted and solidified portion N6, the eighth melted and solidified portion N8, and the ninth melted and solidified portion N9 ought not to come into sight. However, for a better understanding of a disposing relationship among the melted and solidified portions (nuggets) in a cross section, the melted and solidified portions N2, N3, N5, N6, N8, and N9 are indicated.

Figure 5:
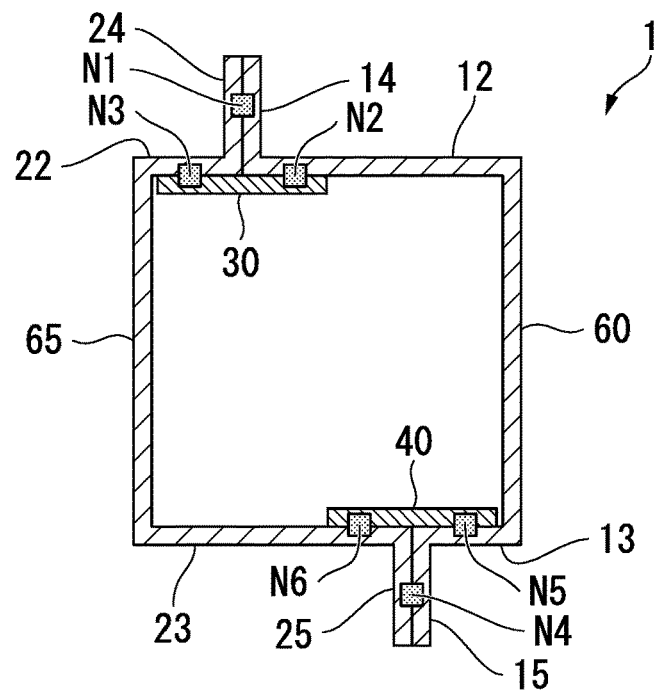
FIG. 5 is a cross-sectional view taken along line A-A in FIG. 1A, and the view shows a third modification example of the side sill.

FIG. 5 is a cross-sectional view taken along line A-A in FIG. 1A, and the view shows a third modification example of the present embodiment. As shown in FIGS. 1A and 1B, the present embodiment has described a case where the widths of the first wall portion 12 and the second wall portion 13 of the side sill outer panel 10 (lengths of the first wall portion 12 and the second wall portion 13 in the short direction) are the same as each other, and the widths of the first wall portion 22 and the second wall portion 23 of the side sill inner panel 20 (lengths of the first wall portion 22 and the second wall portion 23 in the short direction) are the same as each other. On the other hand, as shown in FIG. 5, the side sill 1 may have an asymmetrical hat structure constituted of a side sill outer panel 60 in which the widths of the first wall portion 12 and the second wall portion 13 are different from each other, and a side sill inner panel 65 in which the width of the first wall portion 22 and the second wall portion 23 are different from each other.

In FIG. 5, the second melted and solidified portion N2, the third melted and solidified portion N3, the fifth melted and solidified portion N5, the sixth melted and solidified portion N6 ought not to come into sight. However, for a better understanding of a disposing relationship among the melted and solidified portions (nuggets) in a cross section, the melted and solidified portions N2, N3, N5, and N6 are indicated.

Figure 6:
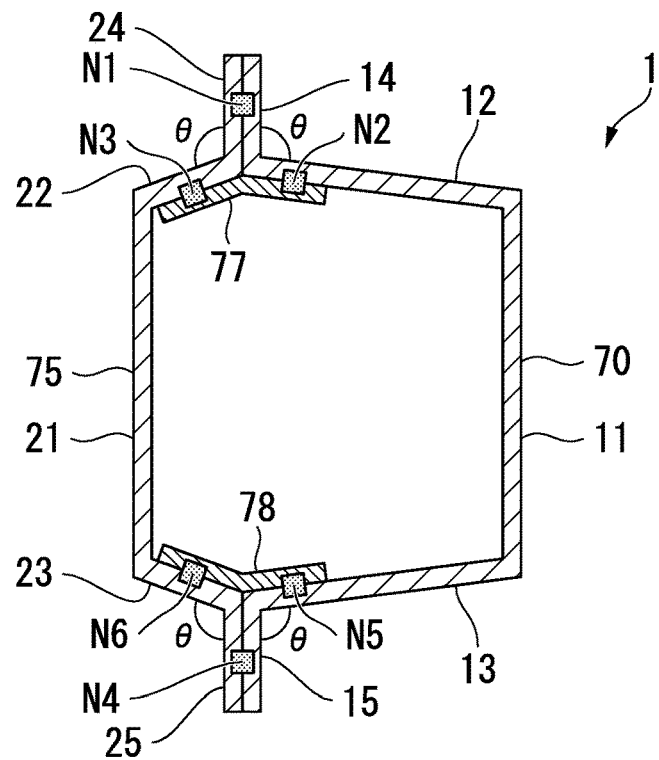
FIG. 6 is a cross-sectional view taken along line A-A in FIG. 1A, and the view shows a fourth modification example of the side sill.

FIG. 6 is a cross-sectional view taken along line A-A in FIG. 1A, and the view shows a fourth modification example of the present embodiment. As shown in FIG. 1B, the present embodiment has described a case where the first wall portion 12 and the second wall portion 13 are perpendicularly erected from the first flange 14 and the second flange 15, and the first wall portion 22 and the second wall portion 23 are perpendicularly erected from the first flange 24 and the second flange 25. On the other hand, as shown in FIG. 6, a side sill outer panel 70 in which the first wall portion 12 and the second wall portion 13 are erected at a predetermined angle θ (for example, 91° to 135°) with respect to the first flange 14 and the second flange 15, and a side sill inner panel 75 in which the first wall portion 22 and the second wall portion 23 are erected at a predetermined angle θ (for example, 91° to 135°) with respect to the first flange 24 and the second flange 25 may be used. In this case, in place of the first joint plate 30 and the second joint plate 40, the joint plate can be joined to the inner wall surfaces of the first wall portion 12 and the first wall portion 22 and the inner wall surfaces of the second wall portion 13 and the second wall portion 23 by using a first joint plate 77 having a V-shaped cross section and a second joint plate 78 having a V-shaped cross section.

In FIG. 6, the second melted and solidified portion N2, the third melted and solidified portion N3, the fifth melted and solidified portion N5, the sixth melted and solidified portion N6 ought not to come into sight. However, for a better understanding of a disposing relationship among the melted and solidified portions (nuggets) in a cross section, the melted and solidified portions N2, N3, N5, and N6 are indicated.

Figure 7:
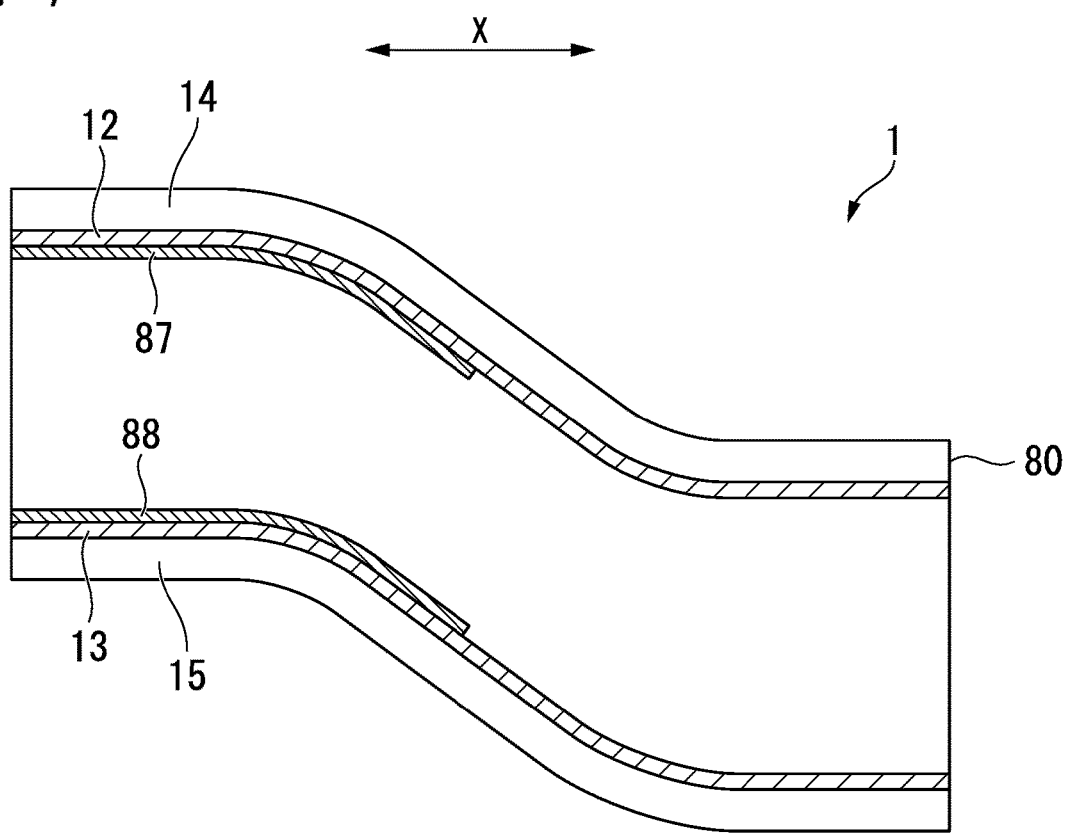
FIG. 7 is a cross-sectional view taken along line B-B in FIG. 1A, and the view shows a fifth modification example of the side sill.

FIG. 7 is a cross-sectional view taken along line B-B in FIG. 1A, and the view shows a fifth modification example of the present embodiment. As shown in FIG. 1A, the present embodiment has described a case where the side sill 1 has a linear shape extending along the longitudinal direction X. On the other hand, as shown in FIG. 7, a center portion of the side sill 1 in the longitudinal direction X may be curved. That is, as shown in FIG. 7, the side sill 1 may be constituted of a side sill outer panel 80 which has a curved center portion, a side sill inner panel which is curved at the same curvature as that of the side sill outer panel 80, and a first joint plate 87 and a second joint plate 88 which are curved and are joined thereto. The center portion of the side sill outer panel 80 is not limited to a case of being curved. For example, an end portion of the side sill outer panel 80 may be curved. That is, at least a part of the side sill outer panel 80 may be curved.

[Second Embodiment]

Figure 8A:
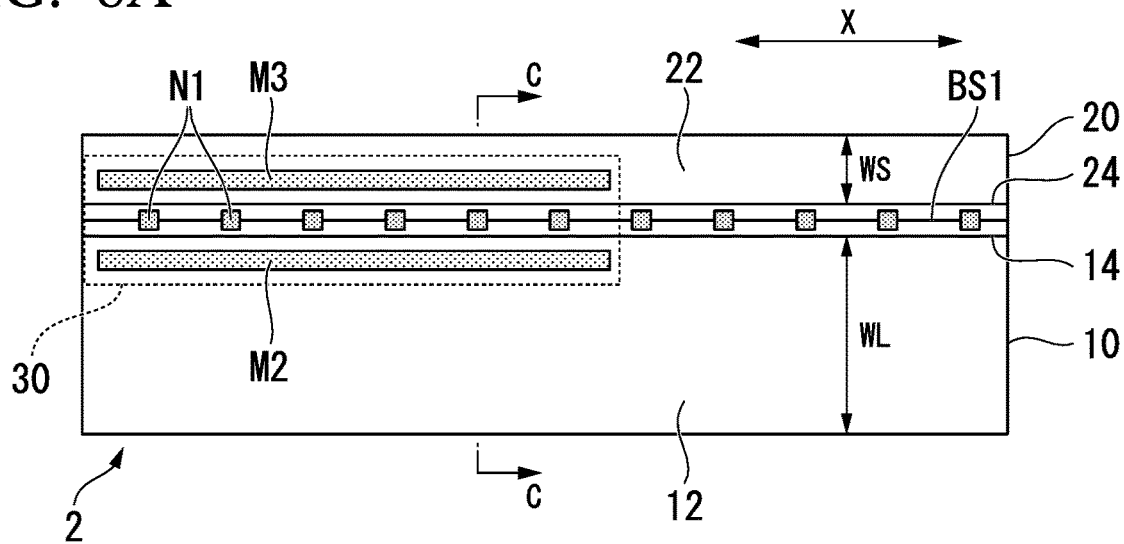
FIG. 8A is a top view showing a side sill according to a second embodiment of the present invention.
Figure 8B:
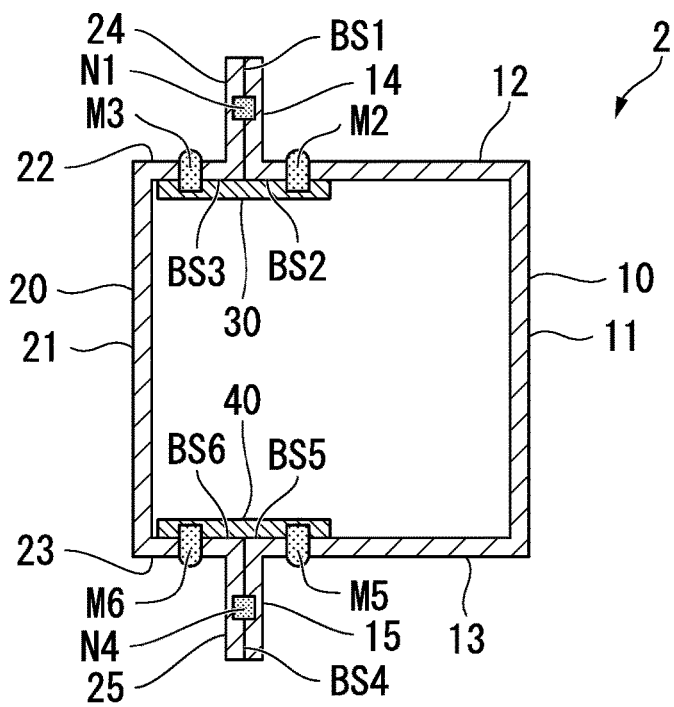
FIG. 8B is a cross-sectional view taken along line C-C in FIG. 8A.
Figure 8C:
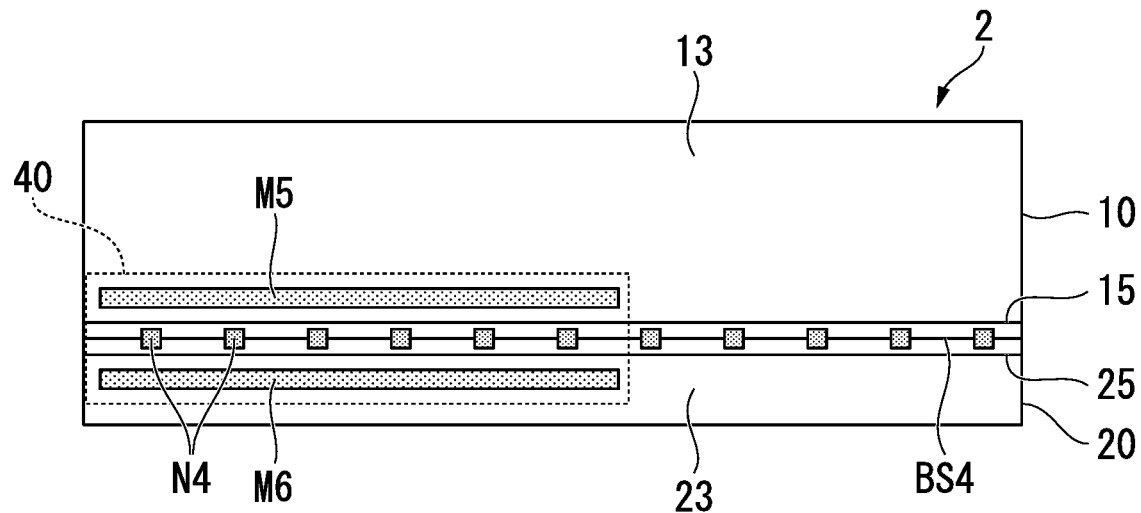
FIG. 8C is a bottom view showing the side sill.

Next, a second embodiment of the present invention will be described. In the present embodiment as well, a side sill will be exemplified as the automobile member according to the present invention. FIGS. 8A to 8C are views showing a side sill 2 according to the present embodiment. FIG. 8A is a top view of the side sill 2, FIG. 8B is a cross-sectional view taken along line C-C in FIG. 8A, and FIG. 8C is a bottom view of the side sill 2.

The side sill 2 according to the present embodiment is different from the side sill 1 according to the first embodiment in that the first joint plate 30 and the second joint plate 40 are continuously welded to the side sill outer panel 10 and the side sill inner panel 20.

As shown in FIGS. 8A and 8B, the first joint plate 30 of the side sill 2 is continuously welded to the inner wall surface of the first wall portion 12 of the side sill outer panel 10 and the inner wall surface of the first wall portion 22 of the side sill inner panel 20 through laser welding.

As shown in FIGS. 8B and 8C, the second joint plate 40 of the side sill 2 is continuously welded to the inner wall surface of the second wall portion 13 of the side sill outer panel 10 and the inner wall surface of the second wall portion 23 of the side sill inner panel 20 through laser welding.

The first joint plate 30 and the first wall portion 12 of the side sill outer panel 10 are joined to each other through continuous welding. As a result, on the border surface BS2 between the first joint plate 30 and the inner wall surface of the first wall portion 12, one second melted and solidified portion M2 is continuously formed along the longitudinal direction X of the side sill 2. That is, one bead-shaped second melted and solidified portion M2 is formed along the longitudinal direction X of the side sill 2.

In addition, the first joint plate 30 and the first wall portion 22 of the side sill inner panel 20 are joined to each other through continuous welding. As a result, on the border surface BS3 between the first joint plate 30 and the inner wall surface of the first wall portion 22, one third melted and solidified portion M3 is continuously formed along the longitudinal direction X of the side sill 2. That is, one bead-shaped third melted and solidified portion M3 is formed along the longitudinal direction X of the side sill 2.

Meanwhile, the second joint plate 40 and the second wall portion 13 of the side sill outer panel 10 are joined to each other through continuous welding. As a result, on the border surface BS5 between the second joint plate 40 and the inner wall surface of the second wall portion 13, one fifth melted and solidified portion M5 is continuously formed along the longitudinal direction X of the side sill 2. That is, one bead-shaped fifth melted and solidified portion M5 is formed along the longitudinal direction X of the side sill 2.

In addition, the second joint plate 40 and the second wall portion 23 of the side sill inner panel 20 are joined to each other through continuous welding. As a result, on the border surface BS6 between the second joint plate 40 and the inner wall surface of the second wall portion 23, one sixth melted and solidified portion M6 is continuously formed along the longitudinal direction X of the side sill 2. That is, one bead-shaped sixth melted and solidified portion M6 is formed along the longitudinal direction X of the side sill 2.

Similar to the first embodiment, in the present embodiment as well, as shown in FIG. 8A, when the width of the first wall portion 12 of the side sill outer panel 10 is WL and the width of the first wall portion 22 of the side sill inner panel 20 is WS, it is preferable that the width WL of the first wall portion 12 and the width WS of the first wall portion 22 are set such that the following Expression (1) is established.

$$0 < WS/WL < 0.8 \quad \text{Expression (1)}$$

As described above, according to the side sill 2 including the first joint plate 30 and the second joint plate 40 and having an asymmetrical hat structure which satisfies the above-described Expression (1), similar to the side sill 1 of the first embodiment, it is possible to enhance the impact energy absorption amount with respect to two different distortion modes, such as axial collapse distortion and three-point bending distortion.

That is, even if the way of joining the first joint plate 30 and the second joint plate 40 is continuous welding, it is possible to limit spot fracture, similar to the first embodiment. As in the side sill 2, in a case where the first joint plate 30 and the second joint plate 40 are laser-welded to each other, the widths of the joint plates can be reduced, compared to a case where the joint plates are spot-welded to each other.

[Modification Example of Second Embodiment]

Figure 9:
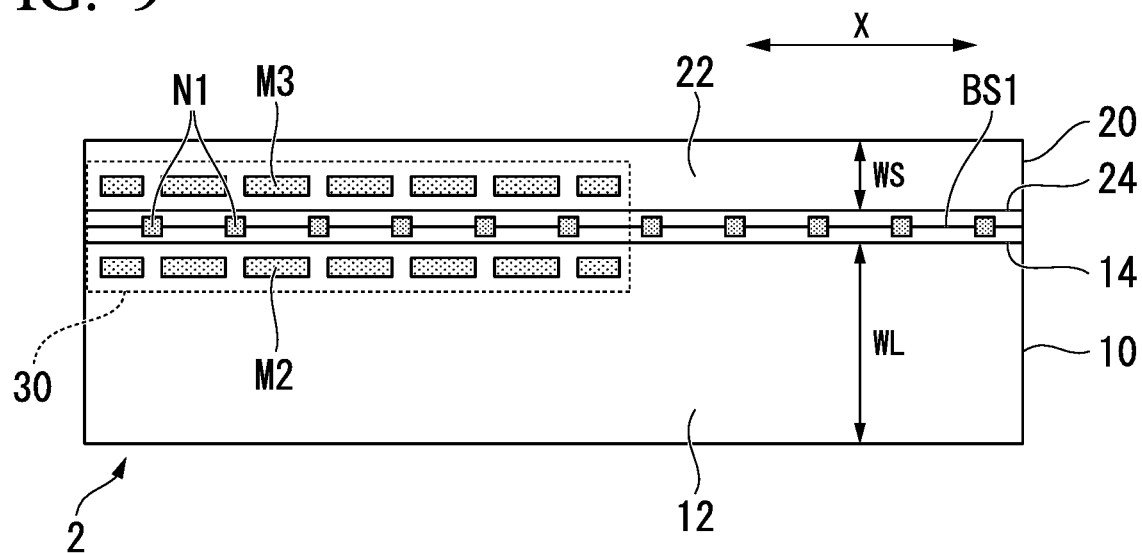
FIG. 9 is a top view showing a modification example of the side sill.

As shown in FIGS. 8A to 8C, the present embodiment has described a case where each of one second melted and solidified portion M2, one third melted and solidified portion M3, one fifth melted and solidified portion M5, and one sixth melted and solidified portion M6 is continuously formed. However, as shown in FIG. 9, the melted and solidified portions may be intermittently formed along the longitudinal direction X. That is, a plurality of second melted and solidified portions M2, a plurality of third melted and solidified portions M3, a plurality of fifth melted and solidified portions M5, and a plurality of sixth melted and solidified portions M6 may be intermittently formed at intervals along the longitudinal direction X. In this case, since the total volume of the melted and solidified portions M2, M3, M5, and M6 is reduced, it is possible to reduce thermal distortion of the side sill 2 due to welding.

[Third Embodiment]

Figure 10A:
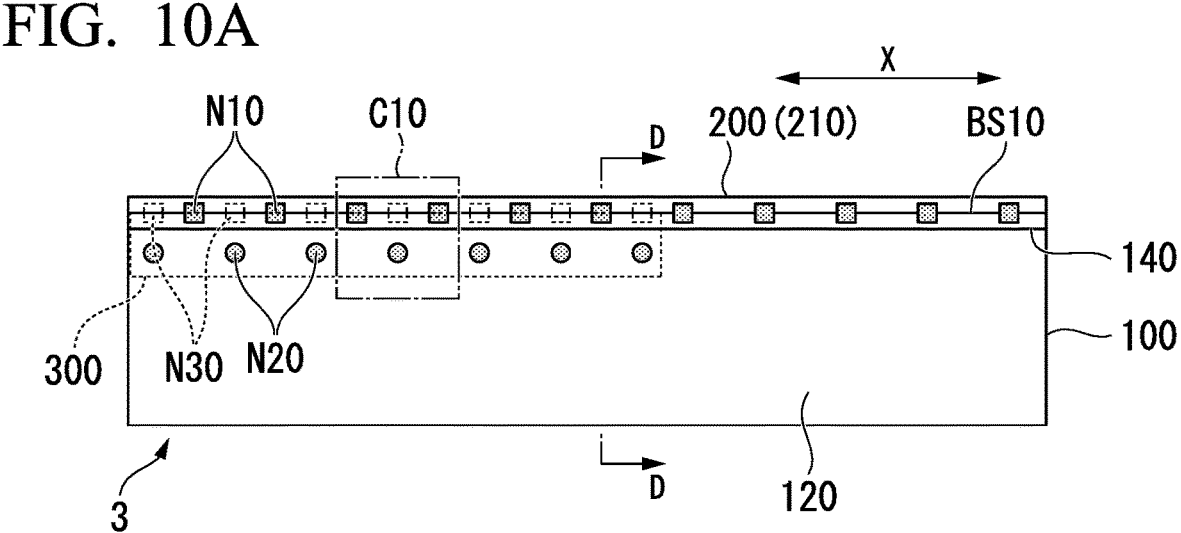
FIG. 10A is a top view showing a frontside member according to a third embodiment of the present invention.
Figure 10B:
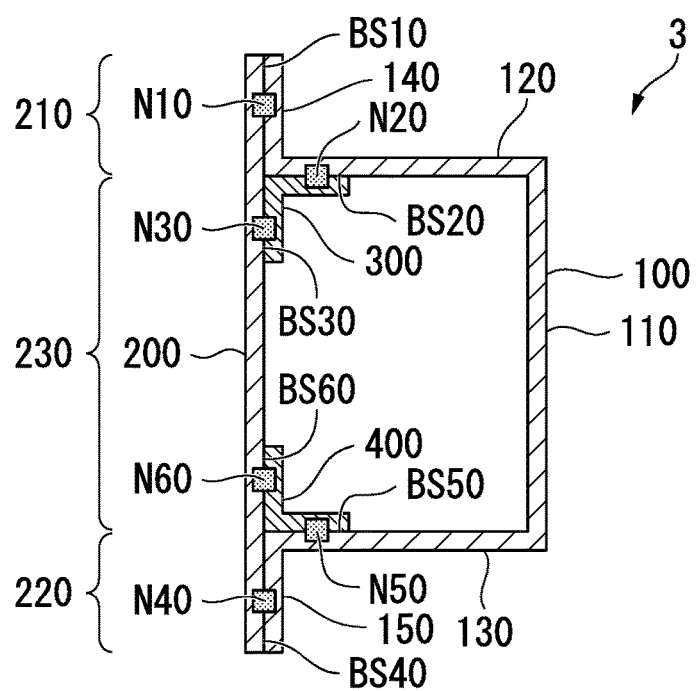
FIG. 10B is a cross-sectional view taken along line D-D in FIG. 10A.
Figure 10C:
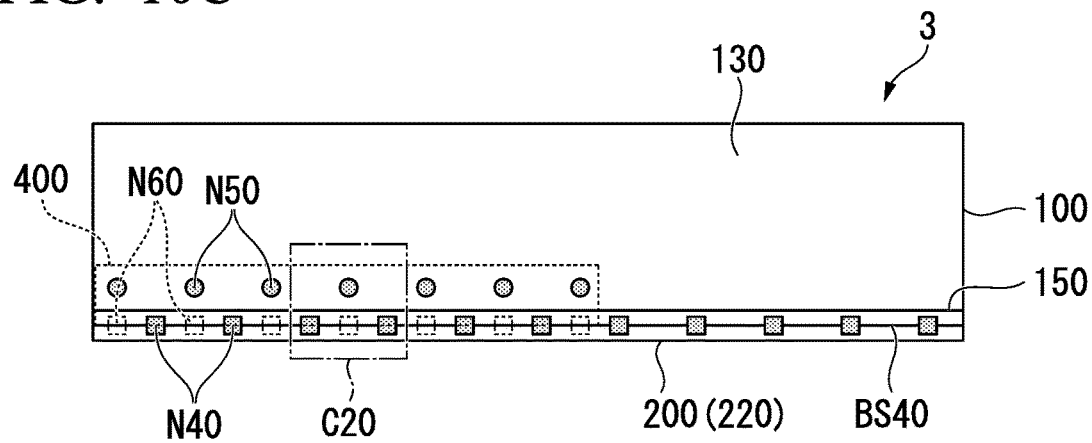
FIG. 10C is a bottom view showing the frontside member.
Figure 11:
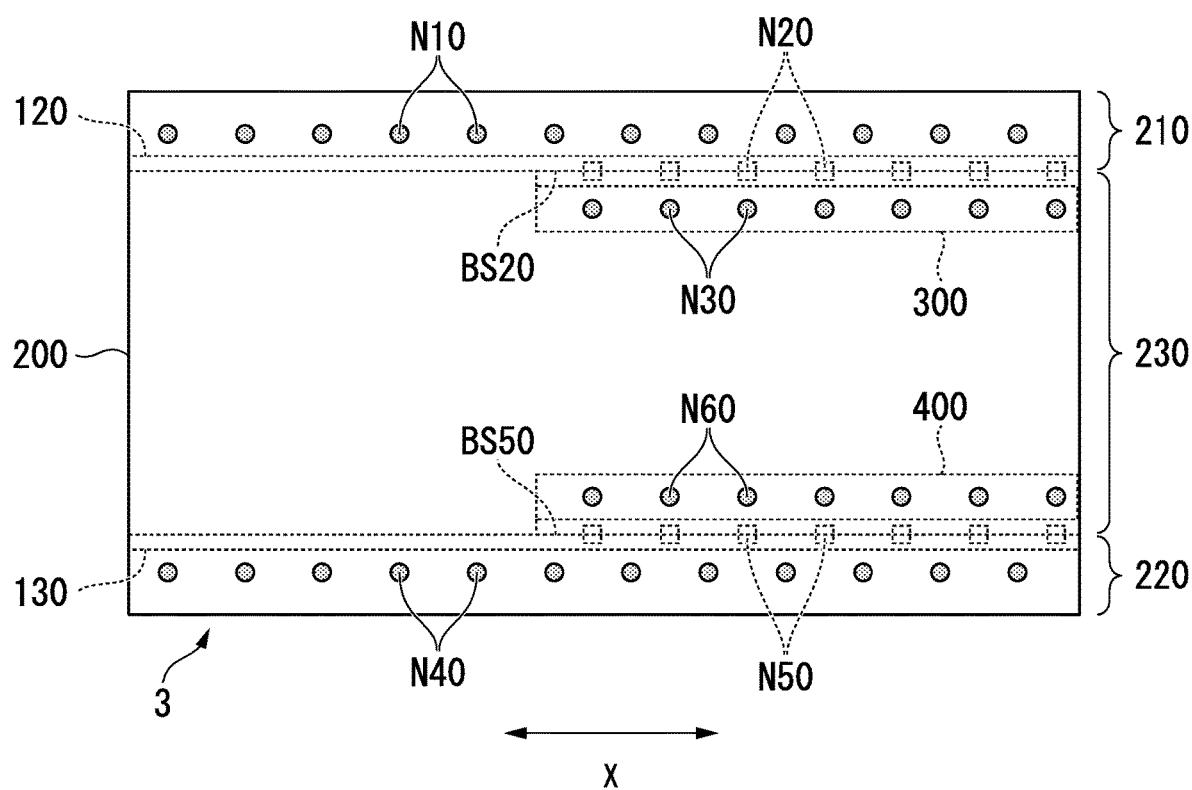
FIG. 11 is a side view of the frontside member seen from a side of a closing plate.

Next, a third embodiment of the present invention will be described. In the present embodiment, a frontside member which is a frame member of a vehicle body of an automobile will be exemplified as the automobile member according to the present invention. FIGS. 10A to 10C and 11 are views showing a frontside member 3 according to the present embodiment. FIG. 10A is a top view of the frontside member 3, FIG. 10B is a cross-sectional view taken along line D-D in FIG. 10A, and FIG. 10C is a bottom view of the frontside member 3. FIG. 11 is a side view of the frontside member 3 seen from a side of a closing plate 200.

In FIG. 10B which is a cross-sectional view taken along line D-D in FIG. 10A, a second melted and solidified portion N20, a third melted and solidified portion N30, a fifth melted and solidified portion N50, and a sixth melted and solidified portion N60 (which will be described below) ought not to come into sight. However, for a better understanding of a disposing relationship among the melted and solidified portions (nuggets) in a cross section, in FIG. 10B, the melted and solidified portions N20, N30, N50, and N60 are indicated.

In addition, in FIG. 10A which is a top view of the frontside member 3, a first melted and solidified portion N10, the second melted and solidified portion N20, and the third melted and solidified portion N30 ought not to come into sight. However, for a better understanding of a disposing relationship among the melted and solidified portions (nuggets) when the frontside member 3 is seen from an upper side, in FIG. 10A, each of the melted and solidified portions N10, N20, and N30 is indicated.

In addition, in FIG. 10C which is a bottom view of the frontside member 3, a fourth melted and solidified portion N40, the fifth melted and solidified portion N50, and the sixth melted and solidified portion N60 ought not to come into sight. However, for a better understanding of a disposing relationship among the melted and solidified portions (nuggets) when the frontside member 3 is seen from a lower side, in FIG. 10C, each of the melted and solidified portions N40, N50, and N60 is indicated.

As shown in FIGS. 10A to 10C and 11, the frontside member 3 is a long hollow cylindrical body which is internally provided with an enclosed space having a rectangular cross section. That is, in the frontside member 3, a cross section perpendicular to the longitudinal direction is a hollow cross section. The frontside member 3 includes a side member inner panel 100 (first member) which is disposed toward an inner side of the vehicle, the closing plate 200 (second member) which is disposed toward an outer side of the vehicle, a first joint plate 300 (first joining plate), and a second joint plate 400 (second joining plate).

The side member inner panel 100 is a hat-shaped steel sheet obtained by press-forming a high tensile strength steel sheet into a hat shape. The side member inner panel 100 includes a pair of flanges which are parallel to each other (first flange 140 and second flange 150), a pair of wall portions (first wall portion 120 and second wall portion 130) which are continuously erected from the pair of flanges, and a web 110 which connects the pair of wall portions to each other. The web 110, the first wall portion 120, the second wall portion 130, the first flange 140, and the second flange 150 are rectangularly flat portions extending along the longitudinal direction X of the frontside member 3.

The first wall portion 120 is erected perpendicularly from one end edge in a short direction of the first flange 140 such that the short direction of the first flange 140 and a short direction of the first wall portion 120 are orthogonal to each other. In addition, the second wall portion 130 is erected perpendicularly from one end edge in a short direction of the second flange 150 such that the short direction of the second flange 150 and a short direction of the second wall portion 130 are orthogonal to each other.

In FIG. 10B, the first wall portion 120 is shown to be continuous at a right angle with respect to the first flange 140. However, the first wall portion 120 is actually continuous via the R-portion having a predetermined radius of curvature (for example, 3 to 15 mm) with respect to the first flange 140. Similarly, in FIG. 10B, the second wall portion 130 is shown to be continuous at a right angle with respect to the second flange 150. However, the second wall portion 130 is actually continuous via the R-portion having a predetermined radius of curvature (for example, 3 to 15 mm) with respect to the second flange 150.

The web 110 connects the first wall portion 120 and the second wall portion 130 to each other such that a short direction of the web 110 is orthogonal to each of the short direction of the first wall portion 120 and the short direction of the second wall portion 130.

In FIG. 10B, the web 110 is shown to be connected at a right angle with respect to the first wall portion 120 and the second wall portion 130. However, the web 110 actually connects the first wall portion 120 and the second wall portion 130 to each other via the R-portion having a predetermined radius of curvature (for example, 3 to 15 mm).

In the side member inner panel 100 according to the present embodiment having a configuration as described above, the width of the first wall portion 120 (length in the short direction) is the same as the width of the second wall portion 130, and the width of the first flange 140 is the same as the width of the second flange 150. The width of the first wall portion 120 may be different from the width of the second wall portion 130, and the width of the first flange 140 may be different from the width of the second flange 150.

The closing plate 200 is a rectangularly flat steel sheet extending in the longitudinal direction X of the frontside member 3. The closing plate 200 is not limited to a steel sheet and need only be formed of a sheet material which can be spot-welded. However, due to a reason similar to the reason described in the first embodiment, it is preferable that the closing plate 200 is formed of the same steel sheet (steel sheet having the same tensile strength and the same sheet thickness) as that of the side member inner panel 100. The closing plate 200 is divided into a first flange joint portion 210, a second flange joint portion 220, and a central joint portion 230 therebetween along its short direction (width direction).

The width of the first flange joint portion 210 is the same as the width of the first flange 140 of the side member inner panel 100. The width of the second flange joint portion 220 is the same as the width of the second flange 150 of the side member inner panel 100. That is, the width of the first flange joint portion 210 is the same as the width of the second flange joint portion 220. The width of the central joint portion 230 is the same as the width of the web 110 of the side member inner panel 100.

In the frontside member 3, the first flange 140 of the side member inner panel 100 and the first flange joint portion 210 of the closing plate 200 are spot-welded to each other in an overlapping state, and the second flange 150 of the side member inner panel 100 and the second flange joint portion 220 of the closing plate 200 are spot-welded to each other in an overlapping state. Since the side member inner panel 100 and the closing plate 200 are joined to each other in this way, an enclosed space having a rectangular cross section is formed along the longitudinal direction X in the frontside member 3.

The first joint plate 300 is a steel sheet extending in the longitudinal direction X and having an L-shaped cross section. The first joint plate 300 is not limited to a steel sheet and need only be formed of a sheet material which can be spot-welded. However, due to a reason similar to the reason described in the first embodiment, it is preferable that the first joint plate 300 is formed of the same steel sheet as those forming the side member inner panel 100.

In a case of being seen in the width direction of the frontside member 3 (width direction of the flange), the first joint plate 300 abuts on an inner wall surface of the first wall portion 120 of the side member inner panel 100 and an inner wall surface of the central joint portion 230 of the closing plate 200 and is spot-welded to the inner wall surfaces thereof such that a border line between the first flange 140 of the side member inner panel 100 and the first flange joint portion 210 of the closing plate 200 is covered. The first joint plate 300 is in non-contact with the web 110. That is, a gap is generated between an end surface of the first joint plate 300 and the web 110.

In the present disclosure, the "inner wall surface" indicates a wall surface facing an internal space of the frontside member 3 (in the present embodiment, an enclosed space having a rectangular cross section). The cross-sectional shape of the internal space is determined in accordance with the shape of the frontside member 3 and is not limited to a rectangular shape.

The second joint plate 400 is a steel sheet extending in the longitudinal direction X and having an L-shaped cross section. The second joint plate 400 is not limited to a steel sheet and need only be formed of a sheet material which can be spot-welded. However, due to a reason similar to the reason described in the first embodiment, it is preferable that the second joint plate 400 is formed of the same steel sheet as that forming the side member inner panel 100.

In a case of being seen in the width direction of the frontside member 3, the second joint plate 400 abuts on an inner wall surface of the second wall portion 130 of the side member inner panel 100 and the inner wall surface of the central joint portion 230 of the closing plate 200 and is spot-welded to the inner wall surfaces thereof such that a border line between the second flange 150 of the side member inner panel 100 and the second flange joint portion 220 of the closing plate 200 is covered. The second joint plate 400 is in non-contact with the web 110. That is, a gap is generated between an end surface of the second joint plate 400 and the web 110.

In addition, a gap is generated between the first joint plate 300 and the second joint plate 400. That is, the first joint plate 300 and the second joint plate 400 are separated to be in non-contact with each other.

Since they are separated to be in non-contact with each other, each of the joint plates can be independently distorted in accordance with the distortion of the joining location (can be distorted while following the distortion of the joining location) at the time of collision distortion. Accordingly, a fracture of spot welding is unlikely to be generated in the joint plate. On the other hand, in a case where if the first joint plate 300 and the second joint plate 400 are integrated, distortion of the first joint plate 300 affects distortion of the second joint plate 400 (stress generated in the first joint plate 300 is transferred to the second joint plate 400), for example. Accordingly, a fracture of spot welding of the first joint plate 300 and the second joint plate 400 is likely to be generated.

As shown in FIGS. 10A, 10B, and 11, the side member inner panel 100 and the closing plate 200 are joined to each other through spot welding. As a result, on a border surface BS10 between the first flange 140 of the side member inner panel 100 and the first flange joint portion 210 of the closing plate 200, a plurality of first melted and solidified portions N10 (nuggets) are formed in a spot shape along the longitudinal direction X of the frontside member 3. In other words, the first flange 140 and the closing plate 200 are joined to each other via the plurality of first melted and solidified portions N10 formed along the longitudinal direction X of the frontside member 3.

In addition, the first joint plate 300 and the first wall portion 120 of the side member inner panel 100 are joined to each other through spot welding. As a result, on a border surface BS20 between the first joint plate 300 and the inner wall surface of the first wall portion 120, a plurality of second melted and solidified portions N20 (nuggets) are formed in a spot shape along the longitudinal direction X of the frontside member 3. In other words, the first joint plate 300 and the inner wall surface of the first wall portion 120 are joined to each other via the plurality of second melted and solidified portions N20 formed along the longitudinal direction X of the frontside member 3.

Moreover, the first joint plate 300 and the central joint portion 230 of the closing plate 200 are joined to each other through spot welding. As a result, on a border surface BS30 between the first joint plate 300 and the inner wall surface of the central joint portion 230, a plurality of third melted and solidified portions N30 (nuggets) are formed in a spot shape along the longitudinal direction X of the frontside member 3. In other words, the first joint plate 300 and the inner wall surface of the central joint portion 230 are joined to each other via the plurality of third melted and solidified portions N30 formed along the longitudinal direction X of the frontside member 3.

Meanwhile, as shown in FIGS. 10C, 10B, and 11, the side member inner panel 100 and the closing plate 200 are joined to each other through spot welding. As a result, on a border surface BS40 between the second flange 150 of the side member inner panel 100 and the second flange joint portion 220 of the closing plate 200, a plurality of fourth melted and solidified portions N40 (nuggets) are formed in a spot shape along the longitudinal direction X of the frontside member 3. In other words, the second flange 150 and the second flange joint portion 220 are joined to each other via the plurality of fourth melted and solidified portions N40 formed along the longitudinal direction X of the frontside member 3.

In addition, the second joint plate 400 and the second wall portion 130 of the side member inner panel 100 are joined to each other through spot welding. As a result, on a border surface BS50 between the second joint plate 400 and the inner wall surface of the second wall portion 130, a plurality of fifth melted and solidified portions N50 (nuggets) are formed in a spot shape along the longitudinal direction X of the frontside member 3. In other words, the second joint plate 400 and the inner wall surface of the second wall portion 130 are joined to each other via the plurality of fifth melted and solidified portions N50 formed along the longitudinal direction X of the frontside member 3.

Moreover, the second joint plate 400 and the central joint portion 230 of the closing plate 200 are joined to each other through spot welding. As a result, on a border surface BS60 between the second joint plate 400 and the inner wall surface of the central joint portion 230, a plurality of sixth melted and solidified portions N60 (nuggets) are formed in a spot shape along the longitudinal direction X of the frontside member 3. In other words, the second joint plate 400 and the inner wall surface of the central joint portion 230 are joined to each other via the plurality of sixth melted and solidified portions N60 formed along the longitudinal direction X of the frontside member 3.

Due to a reason similar to the reason described in the first embodiment, it is preferable that the lengths of the first joint plate 300 and the second joint plate 400 are lengths in accordance with a range in which an impact load entailing axial collapse distortion is propagated inside the frontside member 3. For example, it is preferable that the lengths range from 100 mm to 600 mm. In addition, it is preferable that the lengths of the first joint plate 300 and the second joint plate 400 range from 5% to 75% with respect to the overall length of the frontside member 3.

According to the frontside member 3 including the independent joining plates (first joint plate 300 and second joint plate 400) separated from each other as described above, similar to the first embodiment, it is possible to limit spot fractures generated in order closer to the end portion to which an impact load entailing axial collapse distortion is input, when the impact load is input. As a result, it is possible to enhance the impact energy absorption amount with respect to axial collapse distortion.

An effect of limiting spot fracture can be achieved by joining the first joint plate 300 to the inner wall surface of the first wall portion 120 and the inner wall surface of the central joint portion 230 and joining the second joint plate 400 to the inner wall surface of the second wall portion 130 and the inner wall surface of the central joint portion 230. However, similar to the first embodiment, in order to further limit spot fracture, it is preferable to set the positional relationship among the first melted and solidified portion N10, the second melted and solidified portion N20, and the third melted and solidified portion N30, and the positional relationship among the fourth melted and solidified portion N40, the fifth melted and solidified portion N50, and the sixth melted and solidified portion N60 as follows.

Figure 12A:
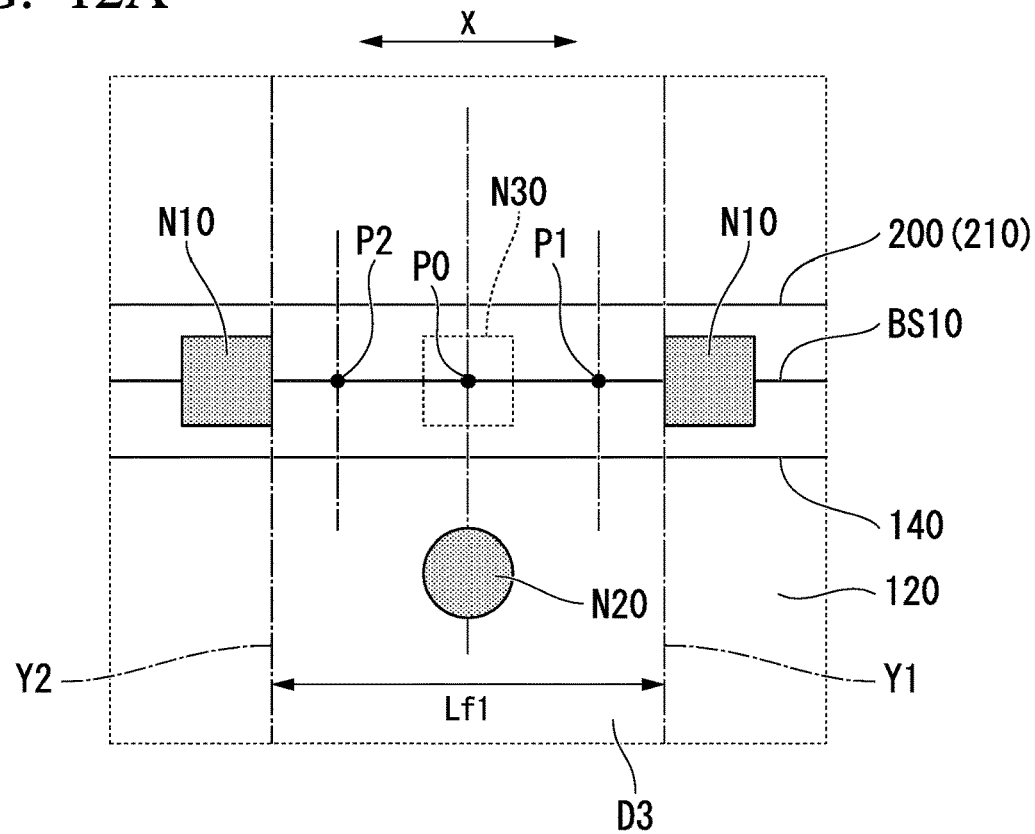
FIG. 12A is an enlarged view of a region indicated with the reference sign C10 in FIG. 10A.

FIG. 12A is an enlarged view of a region C10 shown in FIG. 10A. As shown in FIG. 12A, it is preferable that one second melted and solidified portion N20 and one third melted and solidified portion N30 are disposed in a region D3 of the first wall portion 120 and the central joint portion 230 of the closing plate 200 between two first melted and solidified portions N10 adjacent to each other in the longitudinal direction X of the frontside member 3. Here, as shown in FIG. 12A, the region D3 denotes a region interposed between the perpendicular line Y1 and the perpendicular line Y2. The perpendicular line Y1 is a line which passes through the end portion close to the other first melted and solidified portion N10, in both end portions of one of the two first melted and solidified portions N10 adjacent to each other in the longitudinal direction X and is orthogonal to the longitudinal direction X of the first flange 140 and the closing plate 200. In addition, the perpendicular line Y2 is a line which passes through the end portion close to the one first melted and solidified portion N10, in both the end portions of the other first melted and solidified portion N10 in the longitudinal direction X and is orthogonal to the longitudinal direction X of the first flange 140 and the closing plate 200.

As one of the factors of a fracture of a weld when a load is input to the frontside member 3 from an end portion of the frontside member 3 along the longitudinal direction X, a material between the two welds adjacent to each other is distorted at the time of a collision and stress is applied to the welds. Thus, distortion between welds can be limited by disposing the second melted and solidified portion N20 and the third melted and solidified portion N30 in the region D3. As a result, it is possible to further limit spot fracture.

In order to evenly apply stress caused by distortion at the time of a collision to the second melted and solidified portion N20 and the third melted and solidified portion N30 (that is, in order to reduce stress to be applied), it is preferable that the position of the second melted and solidified portion N20 in the longitudinal direction X and the position of the third melted and solidified portion N30 in the longitudinal direction X are the same as each other.

Here, as shown in FIG. 12A, when the distance between the perpendicular line Y1 and the perpendicular line Y2 (shortest distance between two first melted and solidified portions N10 adjacent to each other in the longitudinal direction X) is Lf1, it is more preferable that one second melted and solidified portion N20 and one third melted and solidified portion N30 are disposed in a region between the position P1 separated from the middle point P0 between the two first melted and solidified portions N10 adjacent to each other to one side in the longitudinal direction X by 0.8× Lf1/2 and the position P2 separated from the middle point P0 to the other side in the longitudinal direction X by 0.8×Lf1/2.

At least a part of the second melted and solidified portion N20 and at least a part of the third melted and solidified portion N30 may be positioned in the region D3 between the two first melted and solidified portions N10 adjacent to each other in the longitudinal direction X. In addition, the positions of the second melted and solidified portion N20 and the third melted and solidified portion N30 in the longitudinal direction X may coincide with the position of the first melted and solidified portion N10 in the longitudinal direction X.

Figure 12B:
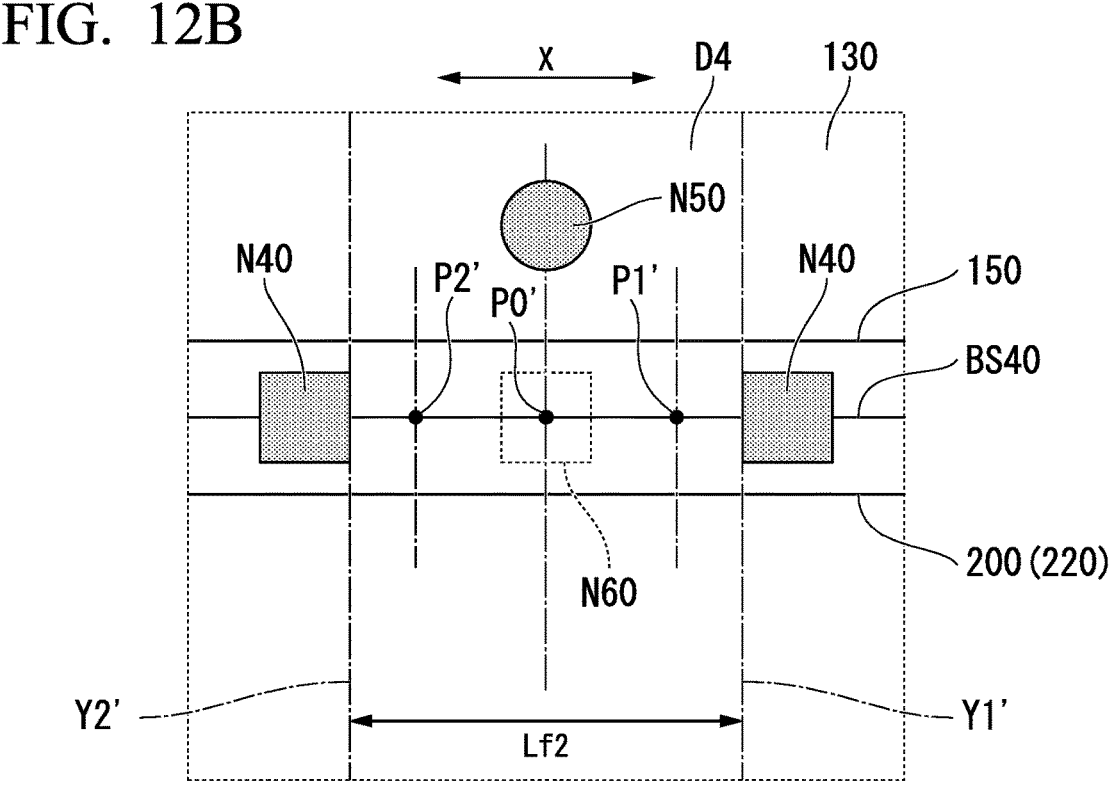
FIG. 12B is an enlarged view of a region indicated with the reference sign C20 in FIG. 10C.

FIG. 12B is an enlarged view of a region C20 shown in FIG. 10C. As shown in FIG. 12B, due to a reason similar to the reason described in FIG. 12A, it is preferable that one fifth melted and solidified portion N50 and one sixth melted and solidified portion N60 are disposed in a region D4 of the second wall portion 130 and the central joint portion 230 of the closing plate 200 between two fourth melted and solidified portions N40 adjacent to each other in the longitudinal direction X of the frontside member 3. Here, similar to FIG. 12A, the region D4 denotes a region interposed between the perpendicular line Y1' and the perpendicular line Y2'. The perpendicular line Y1' is a line which passes through the end portion close to the other fourth melted and solidified portion N40, in both end portions of one of the two fourth melted and solidified portions N40 adjacent to each other in the longitudinal direction X and is orthogonal to the longitudinal direction X of the second flange 150 and the closing plate 200. In addition, the perpendicular line Y2' is a line which passes through the end portion close to the one fourth melted and solidified portion N40, in both the end portions of the other fourth melted and solidified portion N40 in the longitudinal direction X and is orthogonal to the longitudinal direction X of the second flange 150 and the closing plate 200.

It is preferable that the position of the fifth melted and solidified portion N50 in the longitudinal direction X and the position of the sixth melted and solidified portion N60 in the longitudinal direction X are the same as each other.

Here, as shown in FIG. 12B, when the distance between the perpendicular line Y1' and the perpendicular line Y2' (shortest distance between two fourth melted and solidified portions N40 adjacent to each other in the longitudinal direction X of the frontside member 3) is Lf2, it is more preferable that one fifth melted and solidified portion N50 and one sixth melted and solidified portion N60 are disposed in a region between the position P1' separated from the middle point P0' between the fourth melted and solidified portions N40 adjacent to each other to one side in the longitudinal direction X by 0.8×Lf2/2 and the position P2' separated from the middle point P0' to the other side in the longitudinal direction X by 0.8×Lf2/2.

As described above, a shear force acting on the border surfaces BS10 and BS40 can be more effectively reduced by optimizing the positional relationship among the first melted and solidified portion N10, the second melted and solidified portion N20, and the third melted and solidified portion N30, and the positional relationship among the fourth melted and solidified portion N40, the fifth melted and solidified portion N50, and the sixth melted and solidified portion N60. As a result, it is possible to further limit generation of a spot fracture.

At least a part of the fifth melted and solidified portion N50 and at least a part of the sixth melted and solidified portion N60 may be positioned in the region D4 between the two fourth melted and solidified portions N40 adjacent to each other in the longitudinal direction X. In addition, the positions of the fifth melted and solidified portion N50 and the sixth melted and solidified portion N60 in the longitudinal direction X may coincide with the position of the fourth melted and solidified portion N40 in the longitudinal direction X.

In addition, in the present embodiment, although a case where the constituent members constituting the frontside member 3 are joined to each other through spot welding is exemplified, the constituent members need only be spot-joined to each other. The concept of spot joining is the same as the concept described in the first embodiment.

[Fourth Embodiment]

Figure 13A:
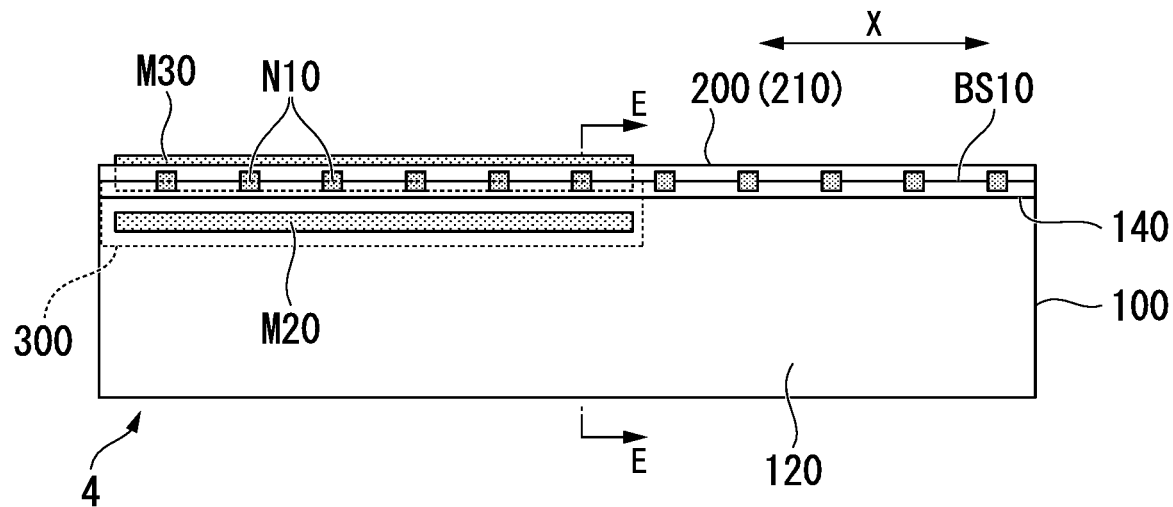
FIG. 13A is a top view showing a frontside member according to a fourth embodiment of the present invention.
Figure 13B:
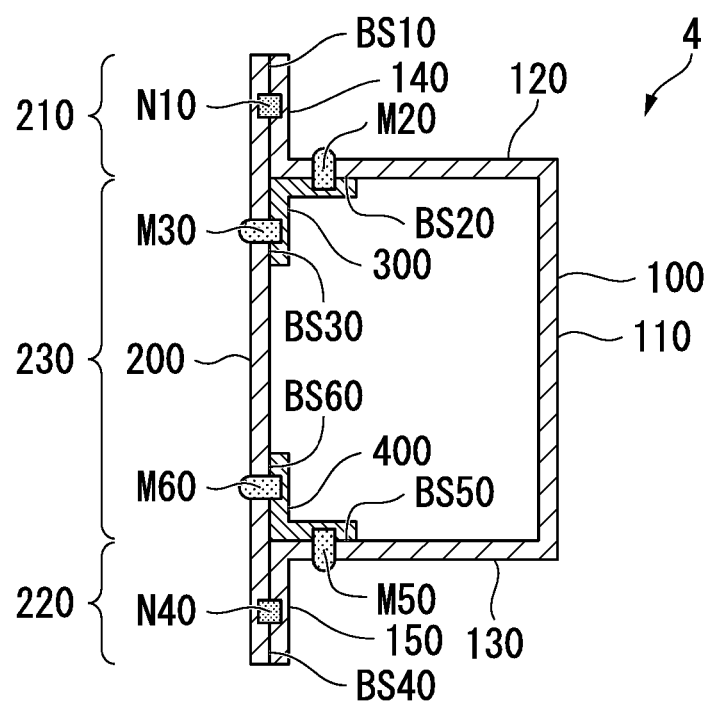
FIG. 13B is a cross-sectional view taken along line E-E in FIG. 13A.
Figure 13C:
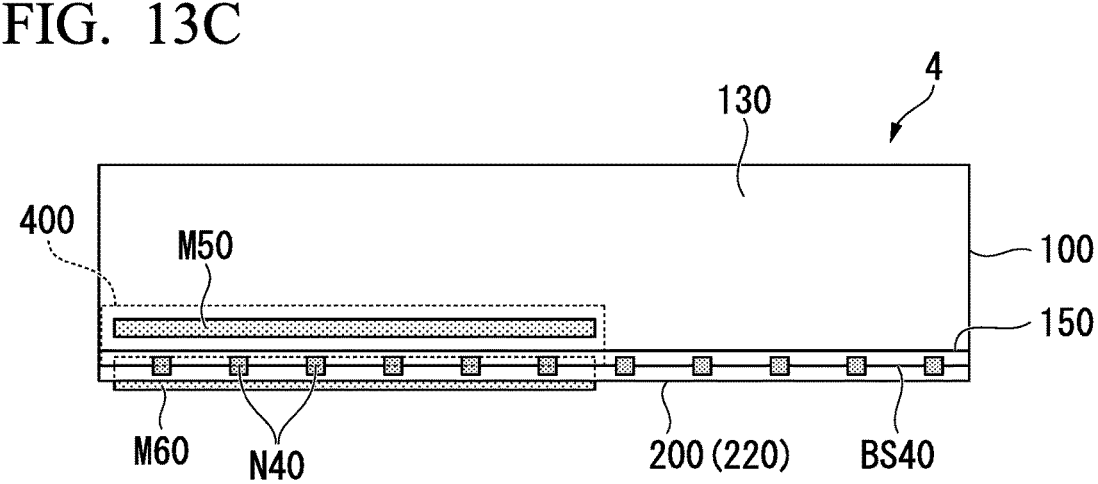
FIG. 13C is a bottom view of the frontside member.
Figure 14:
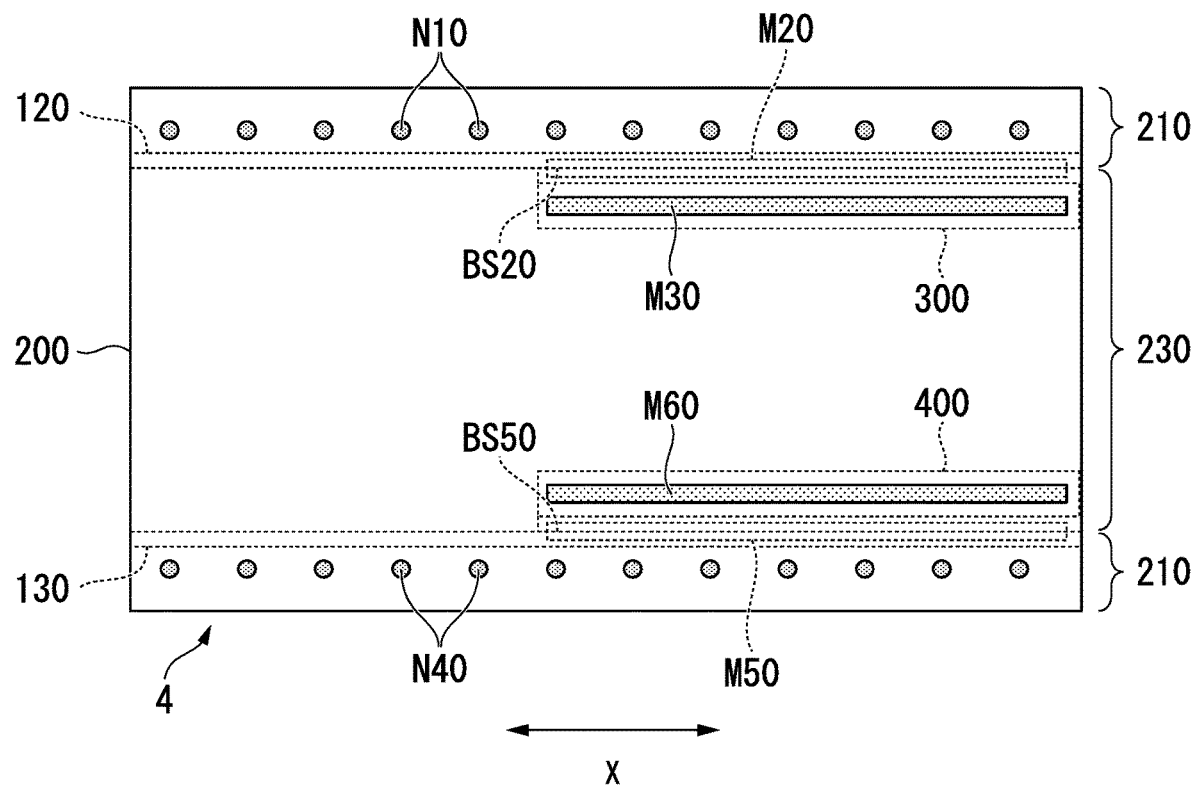
FIG. 14 is a side view of the frontside member seen from a side of the closing plate.
Figure 15:
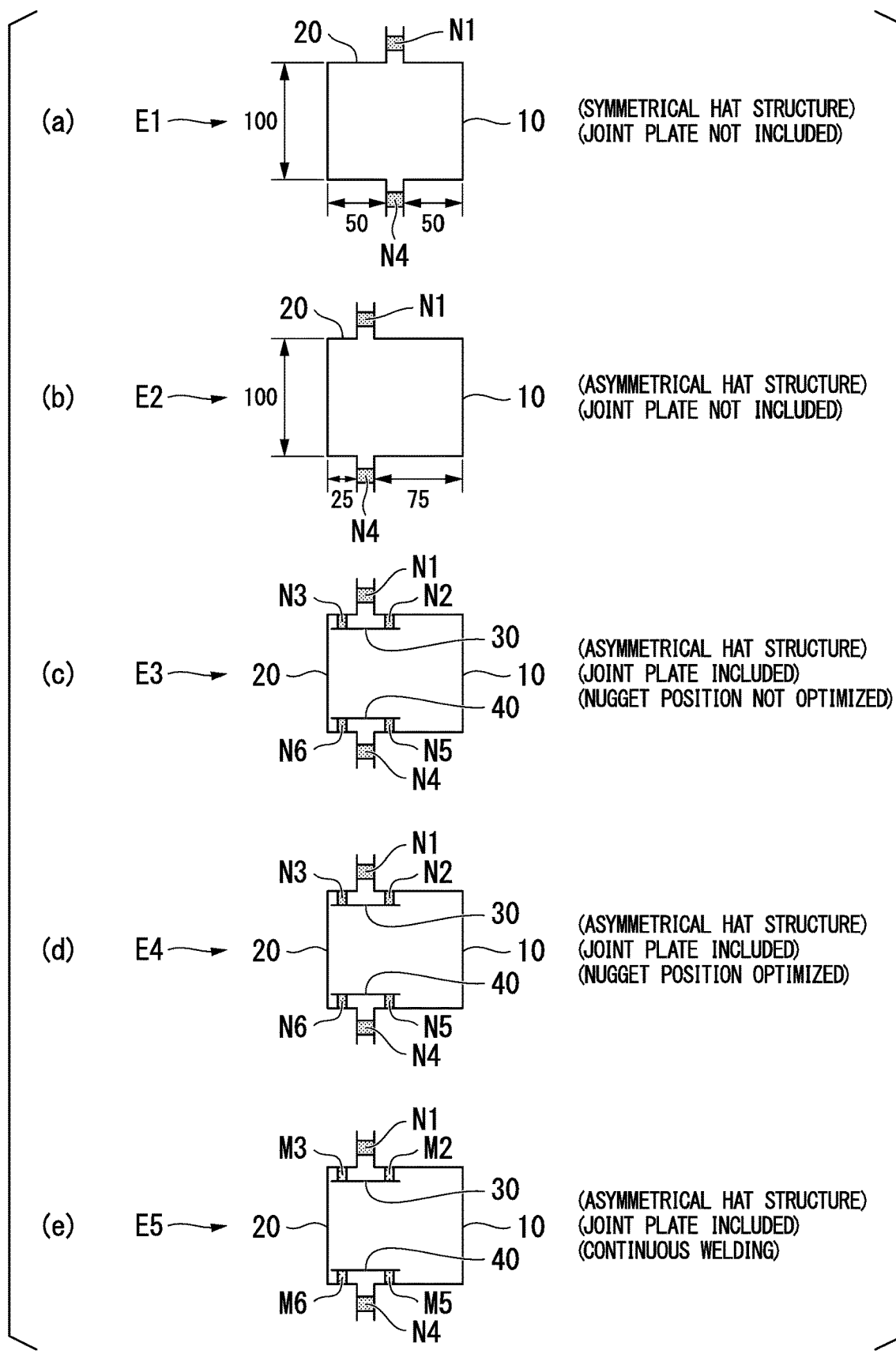
FIG. 15 is a schematic view of configurations of five kinds of side sills E1 to E5 prepared to inspect impact absorption performance of the side sill.

Next, a fourth embodiment of the present invention will be described. In the present embodiment as well, a frontside member will be exemplified as the automobile member according to the present invention. FIGS. 13A to 13C and 14 are views showing a frontside member 4 according to the present embodiment. FIG. 13A is a top view of the frontside member 4, FIG. 13B is a cross-sectional view taken along line E-E in FIG. 13A, and FIG. 13C is a bottom view of the frontside member 4. In addition, FIG. 14 is a side view of the frontside member 4 seen from a side of the closing plate 200.

The frontside member 4 according to the present embodiment is different from the frontside member 3 according to the third embodiment in that the first joint plate 300 and the second joint plate 400 are continuously welded to the side member inner panel 100 and the closing plate 200.

As shown in FIGS. 13A and 13B, the first joint plate 300 of the frontside member 4 is continuously welded to the inner wall surface of the first wall portion 120 of the side member inner panel 100 and the inner wall surface of the central joint portion 230 of the closing plate 200 through laser welding.

As shown in FIGS. 13B and 13C, the second joint plate 400 of the frontside member 4 is continuously welded to the inner wall surface of the second wall portion 130 of the side member inner panel 100 and the inner wall surface of the central joint portion 230 of the closing plate 200 through laser welding.

The first joint plate 300 and the first wall portion 120 of the side member inner panel 100 are joined to each other through continuous welding. As a result, on the border surface BS20 between the first joint plate 300 and the inner wall surface of the first wall portion 120, one second melted and solidified portion M20 is continuously formed along the longitudinal direction X of the frontside member 4. That is, one bead-shaped second melted and solidified portion M20 is formed along the longitudinal direction X of the frontside member 4.

In addition, the first joint plate 300 and the central joint portion 230 of the closing plate 200 are joined to each other through continuous welding. As a result, on the border surface BS30 between the first joint plate 300 and the inner wall surface of the central joint portion 230, one third melted and solidified portion M30 is continuously formed along the longitudinal direction X of the frontside member 4. That is, one bead-shaped third melted and solidified portion M30 is formed along the longitudinal direction X of the frontside member 4.

Meanwhile, the second joint plate 400 and the second wall portion 130 of the side member inner panel 100 are joined to each other through continuous welding. As a result, on the border surface BS50 between the second joint plate 400 and the inner wall surface of the second wall portion 130, one fifth incited and solidified portion M50 is continuously formed along the longitudinal direction X of the frontside member 4. That is, one bead-shaped fifth melted and solidified portion M50 is formed along the longitudinal direction X of the frontside member 4.

In addition, the second joint plate 400 and the central joint portion 230 of the closing plate 200 are joined to each other through continuous welding. As a result, on the border surface BS60 between the second joint plate 400 and the inner wall surface of the central joint portion 230, one sixth melted and solidified portion M60 is continuously formed along the longitudinal direction X of the frontside member 4. That is, one bead-shaped sixth melted and solidified portion M60 is formed along the longitudinal direction X of the frontside member 4.

According to the frontside member 4 including the first joint plate 300 and the second joint plate 400 as described above, similar to the third embodiment, it is possible to limit spot fractures generated in order closer to the end portion to which an impact load entailing axial collapse distortion is input, when the impact load is input. As a result, it is possible to enhance the impact energy absorption amount with respect to axial collapse distortion.

EXAMPLES

Hereinafter, an effect of the aspect of the present invention will be described in more detail with reference to Examples. However, the conditions for Examples are examples of conditions employed to check the feasibility and the effect of the present invention, and the present invention is not limited to the examples of the conditions. The present invention can employ various conditions as long as the object of the present invention is achieved without departing from the gist of the present invention.

[Inspection of Impact Absorption Performance of Side Sill]

In order to inspect the impact absorption performance of side sills, five kinds of side sills E1 to E5 shown in FIGS. 15(a) to 15(e) were prepared. In FIG. 15, for convenience of description, the reference sign used in the descriptions of the first and second embodiments was applied to each of the constituent elements of the side sills E1 to E5.

The side sill E1 shown in FIG. 15(a) was a side sill prepared for Comparative Example 1. The side sill E1 was a side sill realized by removing the first joint plate 30 and the second joint plate 40 from the side sill 1 of the first embodiment, and the side sill had a structure satisfying a condition of "WS/WL=1.0" (symmetrical hat structure).

The side sill E2 shown in FIG. 15(b) was a side sill prepared for Comparative Example 2. The side sill E2 was a side sill realized by removing the first joint plate 30 and the second joint plate 40 from the side sill 1 of the first embodiment, and the side sill had an asymmetrical hat structure satisfying a condition of "WS/WL<0.8".

The side sill E3 shown in FIG. 15(c) was a side sill prepared for Example 1 of the invention. The side sill E3 had the same structure as that of the side sill 1 of the first embodiment, that is, the side sill E3 had the first joint plate 30 and the second joint plate 40 which were spot-welded to the side sill outer panel 10 and the side sill inner panel 20, and the side sill had an asymmetrical hat structure satisfying the condition of "WS/WL<0.8".

However, in the side sill E3, the positions of the second melted and solidified portion N2 and the third melted and solidified portion N3 in the longitudinal direction X coincided with the position of the first melted and solidified portion N1 in the longitudinal direction X. In addition, the positions of the fifth melted and solidified portion N5 and the sixth melted and solidified portion N6 in the longitudinal direction X coincided with the position of the fourth melted and solidified portion N4 in the longitudinal direction X. For convenience, such a disposed state of the melted and solidified portion will be referred to as "not optimized".

The side sill E4 shown in FIG. 15(d) was a side sill prepared for Example 2 of the invention. The side sill E4 had the same structure as that of the side sill 1 of the first embodiment, that is, the side sill E4 had the first joint plate 30 and the second joint plate 40 which were spot-welded to the side sill outer panel 10 and the side sill inner panel 20, and the side sill had an asymmetrical hat structure satisfying the condition of "WS/WL<0.8".

However, in the side sill E4, the positions of the second melted and solidified portion N2 and the third melted and solidified portion N3 in the longitudinal direction X coincided with the position of the middle point P0 in the longitudinal direction X. In addition, the positions of the fifth melted and solidified portion N5 and the sixth melted and solidified portion N6 in the longitudinal direction X coincided with the position of the middle point P0' in the longitudinal direction X. That is, in the side sill E4, the second melted and solidified portion N2 and the third melted and solidified portion N3 were disposed in the region D1 shown in FIG. 2A, and the fifth melted and solidified portion N5 and the sixth melted and solidified portion N6 were disposed in the region D2 shown in FIG. 2B. For convenience, such a state will be referred to as "optimized".

The side sill E5 shown in FIG. 15(e) was a side sill prepared for Example 3 of the invention. The side sill E5 had the same structure as that of the side sill 2 of the second embodiment, that is, the side sill E5 had the first joint plate 30 and the second joint plate 40 which were continuously welded to the side sill outer panel 10 and the side sill inner panel 20, and the side sill had an asymmetrical hat structure satisfying the condition of "WS/WL<0.8".

In the side sill E1 having a symmetrical hat structure, when the width of the web 11 of the side sill outer panel 10 (web 21 of the side sill inner panel 20) was 100, the width WL of the first wall portion 12 (second wall portion 13) of the side sill outer panel 10 was set to 50, and the width WS of the first wall portion 22 (second wall portion 23) of the side sill inner panel 20 was set to 50 (that is, WS/WL=1.0).

In the side sills E2 to E5 having an asymmetrical hat structure, when the width of the web 11 of the side sill outer panel 10 (web 21 of the side sill inner panel 20) was 100, the width WL of the first wall portion 12 (second wall portion 13) of the side sill outer panel 10 was set to 75, the width WS of the first wall portion 22 (second wall portion 23) of the side sill inner panel 20 was set to 25 (that is, WS/WL=0.33).

In the side sills E1 to E5, as the side sill outer panel 10 and the side sill inner panel 20, steel sheets press-formed into a hat shape having the sheet thickness of 1.4 mm, the tensile strength of 980 MPa, and the overall length of 350 mm were used. In the side sills E3 to E5, as the first joint plate 30 and the second joint plate 40, flat steel sheets having the sheet thickness of 1.4 mm, the tensile strength of 980 MPa, and the overall length of 350 mm were used.

When the side sills E1 to E5 were manufactured, spot welding was performed such that the first melted and solidified portion N1 and the fourth melted and solidified portion N4 were formed at an interval of 40 mm along the longitudinal direction X (such that Lf1 and Lf2 shown in FIGS. 2A and 2B became 40 mm) on the flange border surface. In addition, the condition for spot welding was set such that the nugget diameters of the melted and solidified portions (N1 to N6) formed through spot welding became $4\sqrt{t}$ (t: sheet thickness). In addition, the condition for laser welding was set such that the lengths of the melted and solidified portions (M2, M3, M4, and M5) continuously formed through laser welding became 350 mm.

(1) Analysis of impact energy absorption amount with respect to three-point bending distortion A numerical analysis test for the impact energy absorption amount with respect to three-point bending distortion was performed by using the side sill E1 of Comparative Example 1 having a symmetrical hat structure, the side sill E2 of Comparative Example 2 having an asymmetrical hat structure, and the side sill E3 of Example 1 of the invention having an asymmetrical hat structure among the side sills E1 to E5. In this test only, the side sills E1, E2, and E3 had an overall length of 1,000 mm. In addition, WS/WL was set to 0.9 for E2, and WS/WL was set to three levels, such as 0.33, 0.5, and 0.75, for E3.

Figure 16:
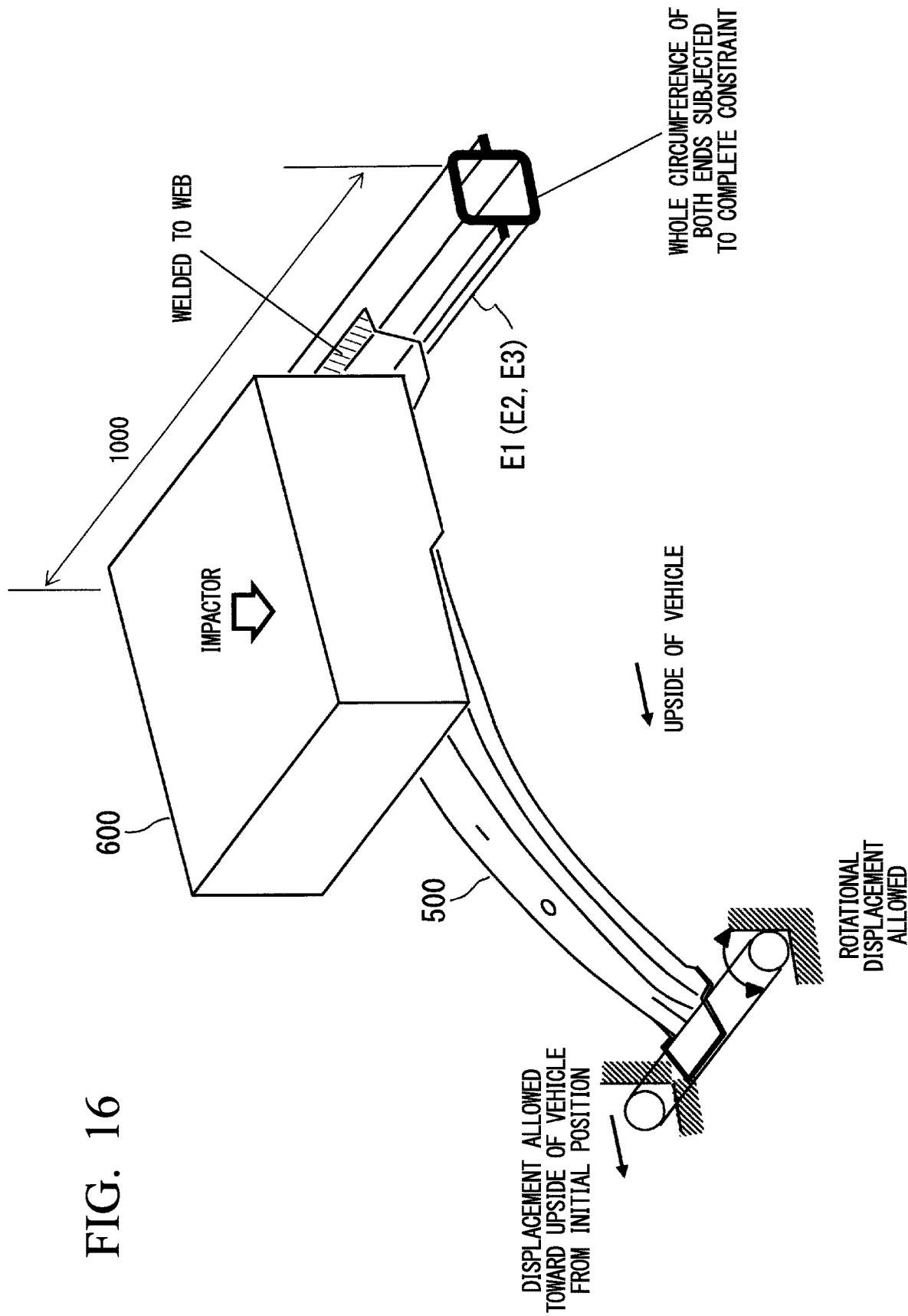
FIG. 16 is a first view showing a method of analyzing an impact energy absorption amount with respect to three-point bending distortion of the side sill.

As shown in FIG. 16, a B pillar 500 formed of a steel sheet having the sheet thickness of 1.4 mm and tensile strength of 590 MPa was joined to the web 11 of the side sill outer panel 10 of the side sill E1. The constraint condition for both ends of the side sill E1 was subjected to complete constraint for the whole circumference. As the constraint condition for an upper end of a vehicle of the B pillar 500, rotational displacement was allowed and displacement only toward the upside of the vehicle from an initial position was allowed.

Figure 17:
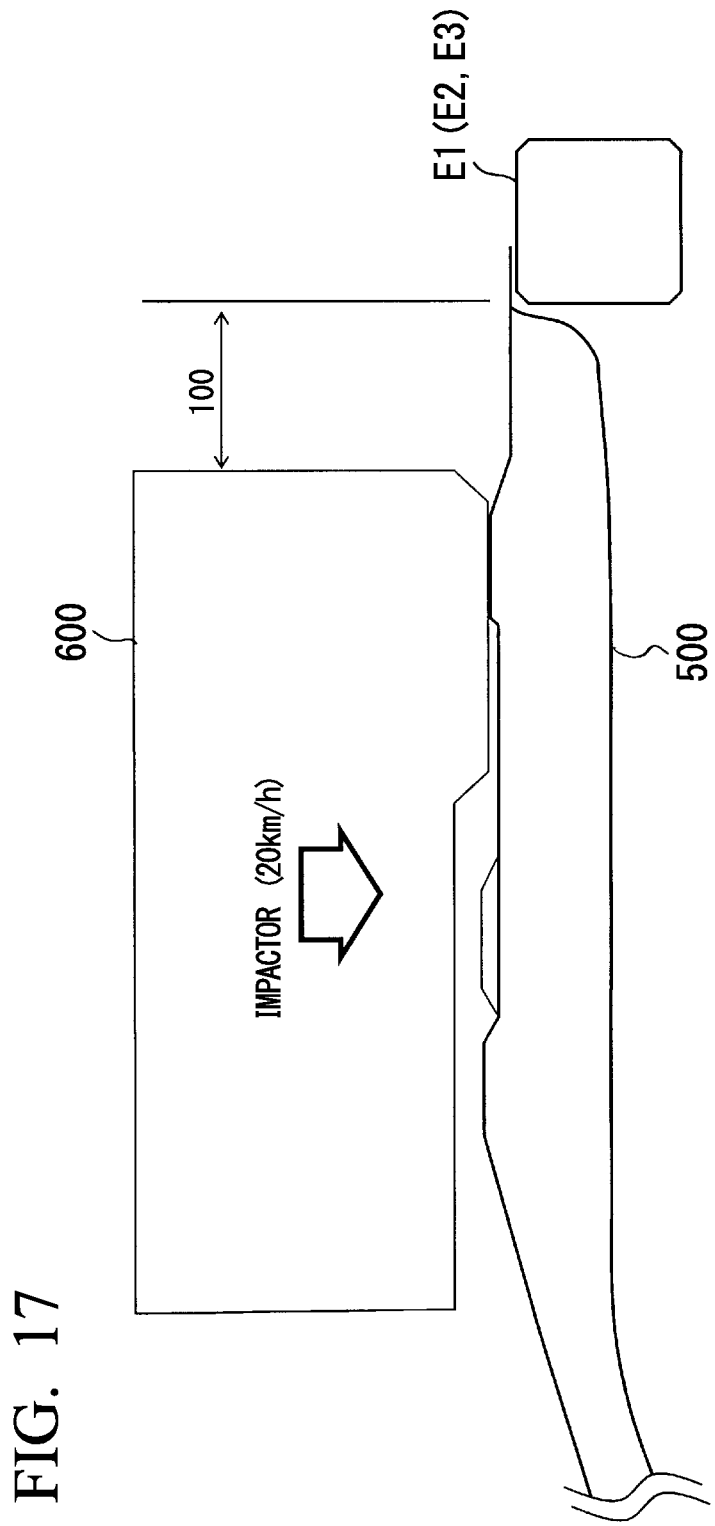
FIG. 17 is a second view showing the method of analyzing an impact energy absorption amount with respect to three-point bending distortion of the side sill.

As shown in FIGS. 16 and 17, in a state where the side sill E1 was horizontally disposed, a rigid body (impactor) 600 was caused to collide with the B pillar 500 under the condition in which the speed was 20 km/h and the stroke was 170 mm, so that three-point bending distortion was caused in the side sill E1, and an impact energy absorption amount EA (kJ) was analyzed. A test simulating a similar side collision was also performed with respect to the side sills E2 and E3.

Figure 18:
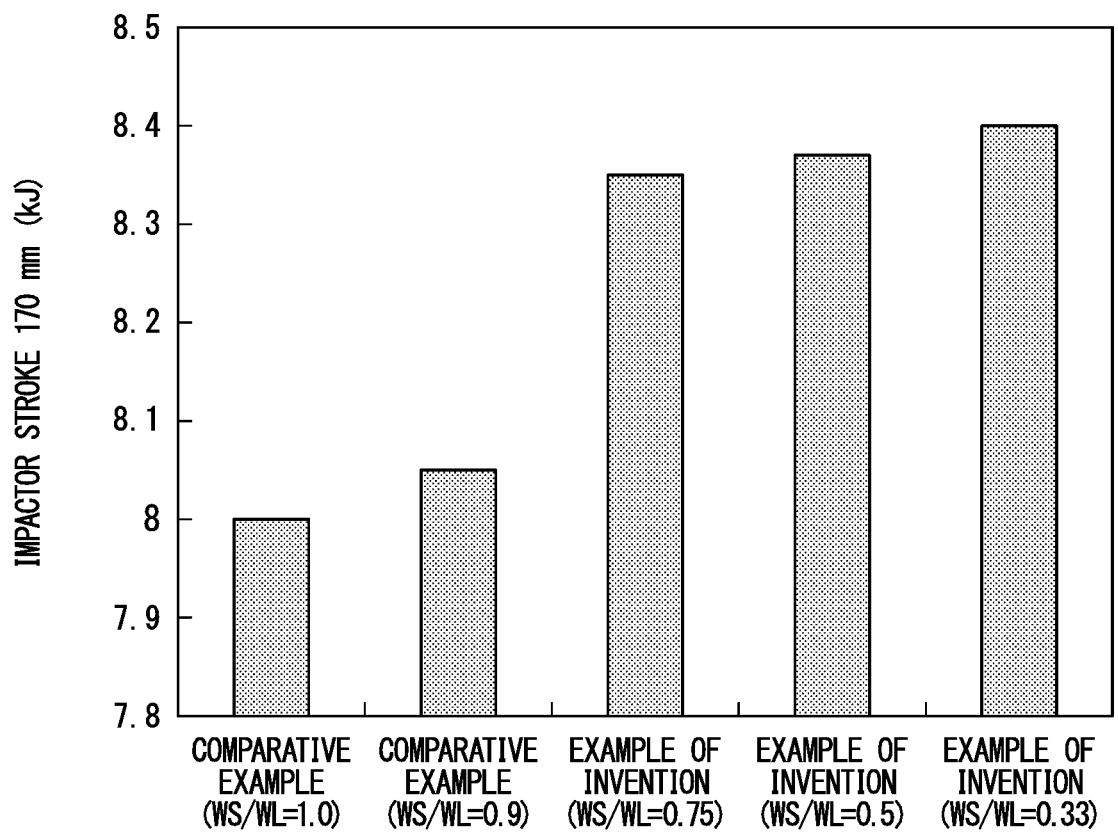
FIG. 18 is a graph showing an analysis result of impact energy absorption amounts EA (kJ) when three-point bending distortion is caused in the side sills of Comparative Examples and Examples of the invention.

FIG. 18 shows an analysis result of the impact energy absorption amounts EA with respect to three-point bending distortion, in which each of the side sills E1, E2, and E3 was analyzed. As shown in FIG. 18, it was checked that the impact energy absorption amounts EA of the side sills E3 (three Examples of the invention in FIG. 18) having an asymmetrical hat structure were higher than the impact energy absorption amount EA of the side sill E1 (Comparative Example of WS/WL=1.0 in FIG. 18) having a symmetrical hat structure. In addition, it was checked that the impact energy absorption amounts EA of the side sills E3 having an asymmetrical hat structure were also higher than that of the side sill E2 (Comparative Example of WS/WL=0.9 in FIG. 18) having an asymmetrical hat structure. That is, it was checked that even in a side sill having an asymmetrical hat structure, in a case of WS/WL≥0.8 (in a case where the above-described Expression (1) was not satisfied), the impact energy absorption amount EA decreased.

Figure 19:
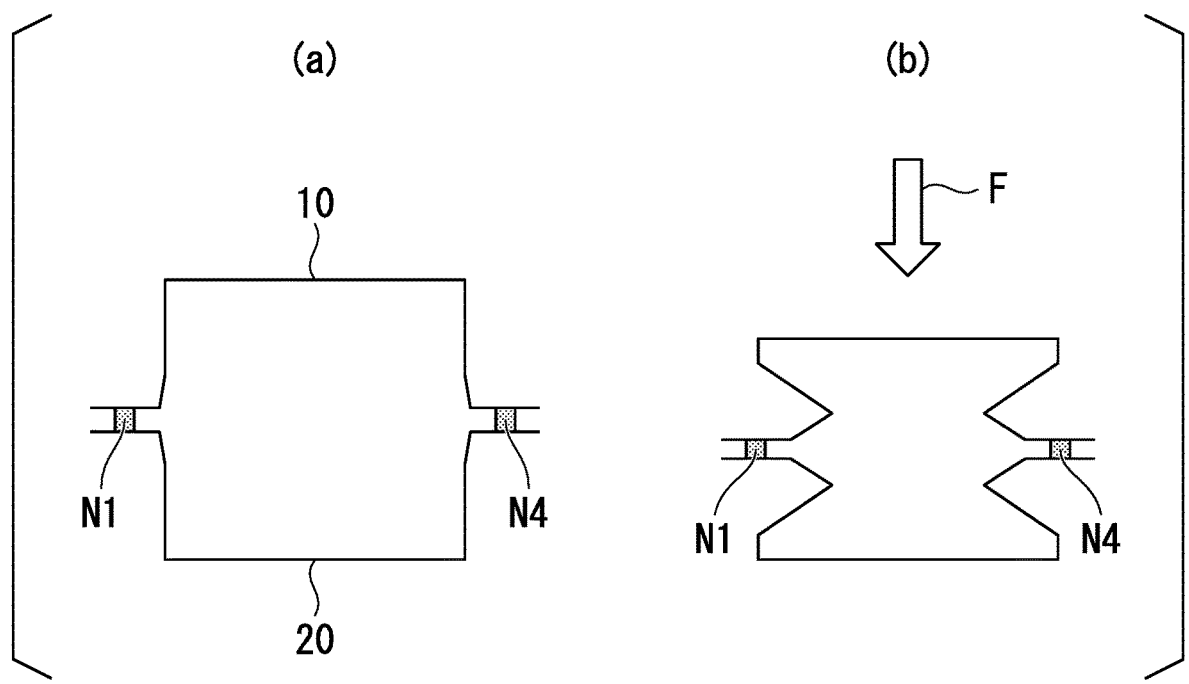
FIG. 19 is a schematic view showing an example of distortion when a load is input to a side sill having a symmetrical hat structure.
Figure 20:
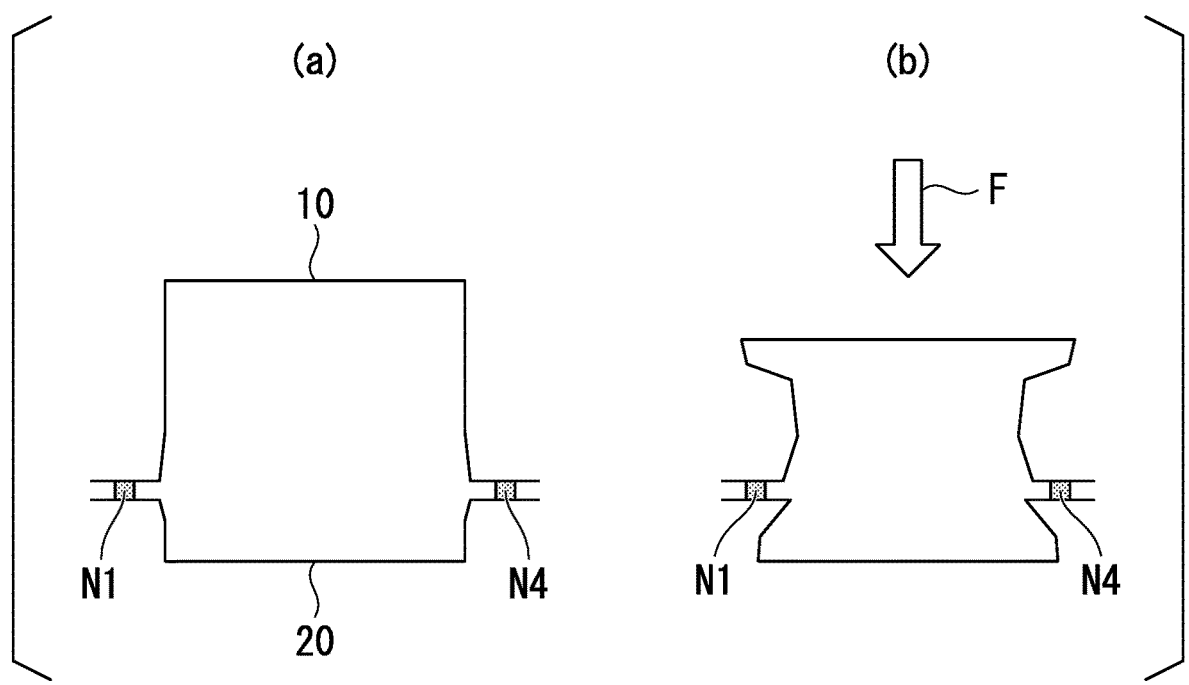
FIG. 20 is a schematic view showing an example of distortion when a load is input to a side sill having an asymmetrical hat structure.
Figure 21:
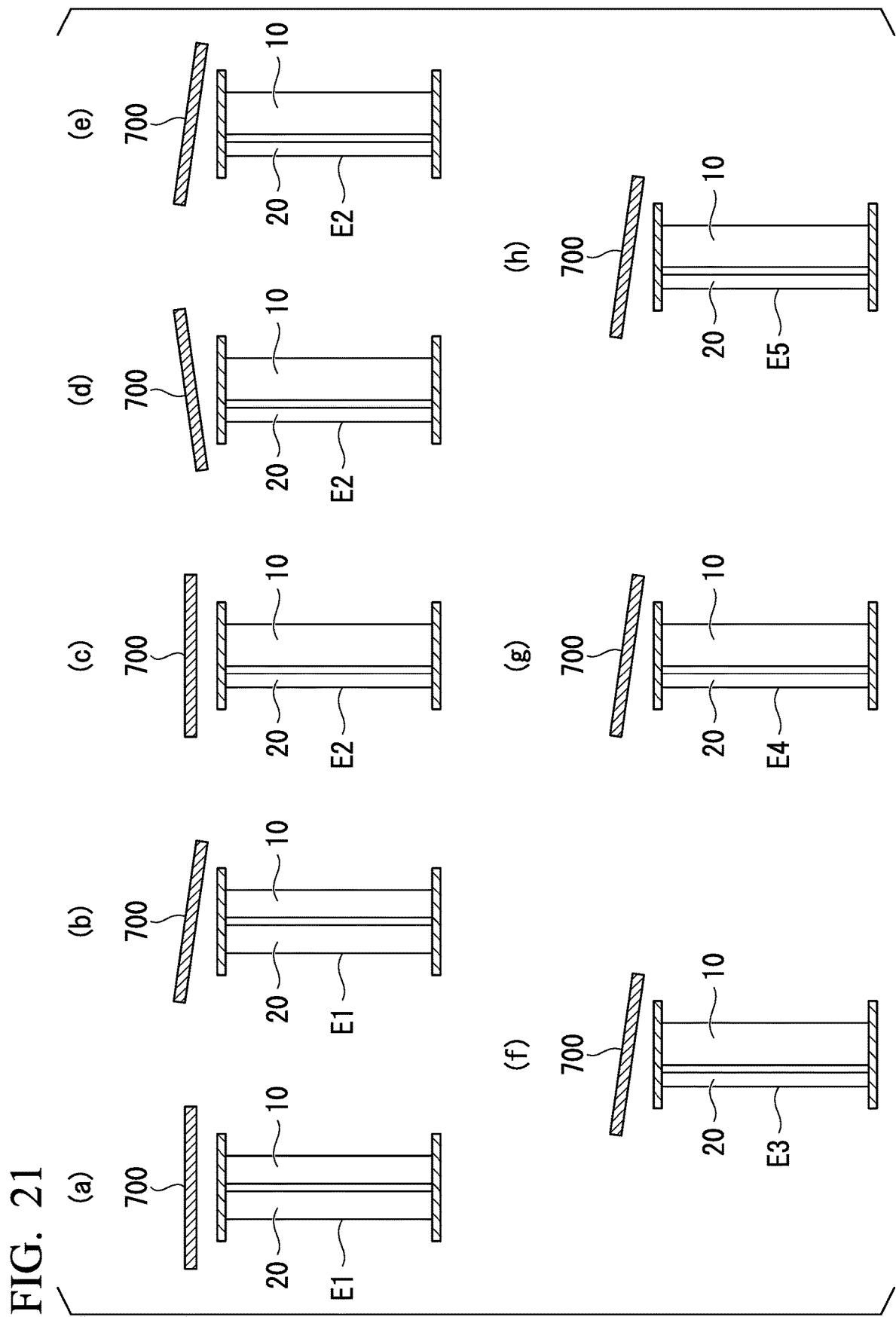
FIG. 21 is a schematic view showing various conditions for analyzing the impact energy absorption amounts of the side sills with respect to axial collapse distortion.

The reason will be described by using FIGS. 19 and 20. FIG. 19 is a schematic view showing a side sill having a symmetrical hat structure. FIG. 19(a) shows a state before a load is input to the side sill, and FIG. 19(b) shows a state after a load is input to the side sill. In addition, FIG. 20 is a schematic view showing a side sill having an asymmetrical hat structure. FIG. 20(a) shows a state before a load is input to the side sill, and FIG. 20(b) shows a state after a load is input to the side sill.

As shown in FIGS. 19 and 20, an impact load F is input to the side sill outer panel 10 due to a side collision, the overlapping portion of the flanges are distorted to the inner side of the side sill in the width direction. At this time, the flanges are close to the load input position, distortion of the flanges becomes significant. In the side sill having a symmetrical hat structure shown in FIG. 19, compared to the side sill having an asymmetrical hat structure shown in FIG. 20, the flanges are close to the load input position. Therefore, in the side sill having a symmetrical hat structure shown in FIG. 19, distortion of the flanges becomes significant and the impact energy absorption amount EA becomes small. Meanwhile, in the side sill having an asymmetrical hat structure shown in FIG. 20, since the flanges are far from the load input position, distortion of the flanges becomes small and the impact energy absorption amount EA becomes significant.

As described above, according to the side sill E3 of Example 1 of the invention having an asymmetrical hat structure, the impact energy absorption amount with respect to three-point bending distortion can be enhanced. This effect can also be achieved in the side sill E4 of Example 2 of the invention having an asymmetrical hat structure, the side sill E5 of Example 3 of the invention, and the side sill E2 of Comparative Example 2. However, as shown in FIG. 18, in the side sills E3 to E5 satisfying the above-described Expression (1), the above-described effect becomes noticeable.

(2) Analysis of Impact Energy Absorption Amount with Respect to Axial Collapse Distortion Subsequently, the numerical analysis test of the impact energy absorption amount with respect to axial collapse distortion was performed by using the side sills E1 to E5. Specifically, after one end portion of each of the side sills E1 to E5 in the longitudinal direction was fixed, a flat sheet-shaped rigid body 700 in a parallel state or a state of being inclined by 10° was caused to collide with the other end portion of each of the side sills E1 to E5 in the longitudinal direction. The collision speed of the rigid body 700 with respect to the side sills E1 to E5 was set to 20 km/h.

Figure 22:
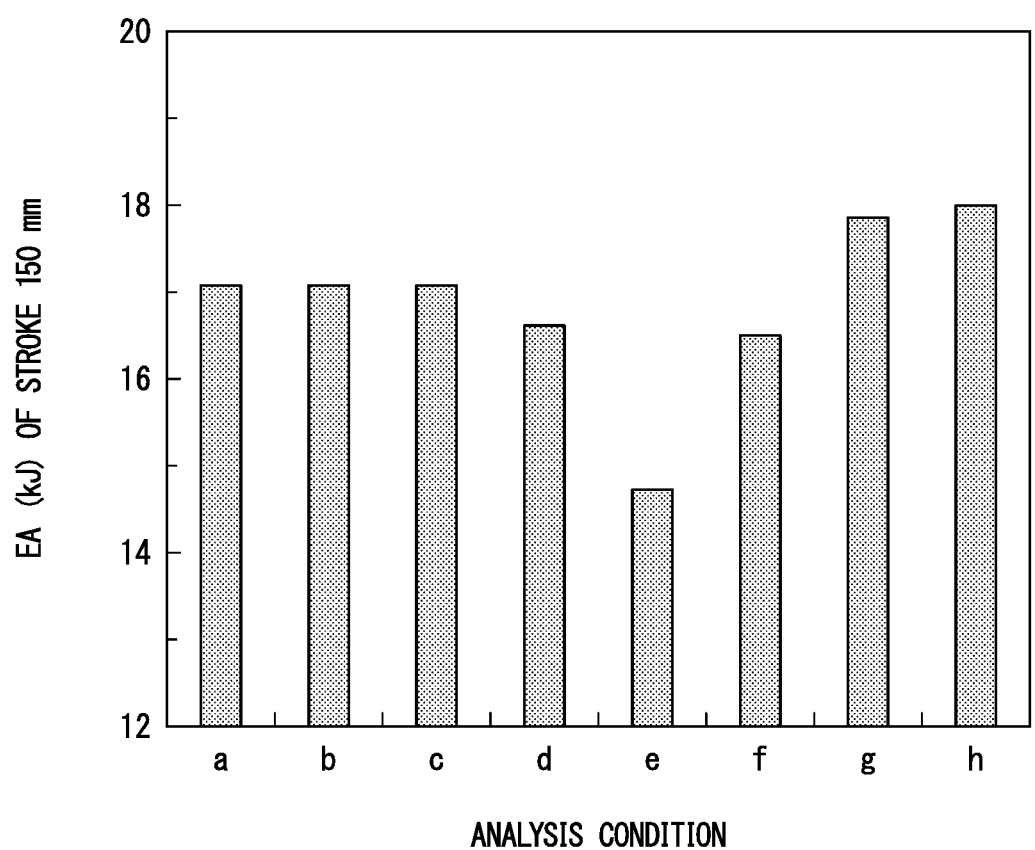
FIG. 22 is a graph showing an analysis result of the impact energy absorption amounts EA (kJ) when axial collapse distortion is caused in the side sills of the comparative examples and Examples of the invention.
Figure 23:
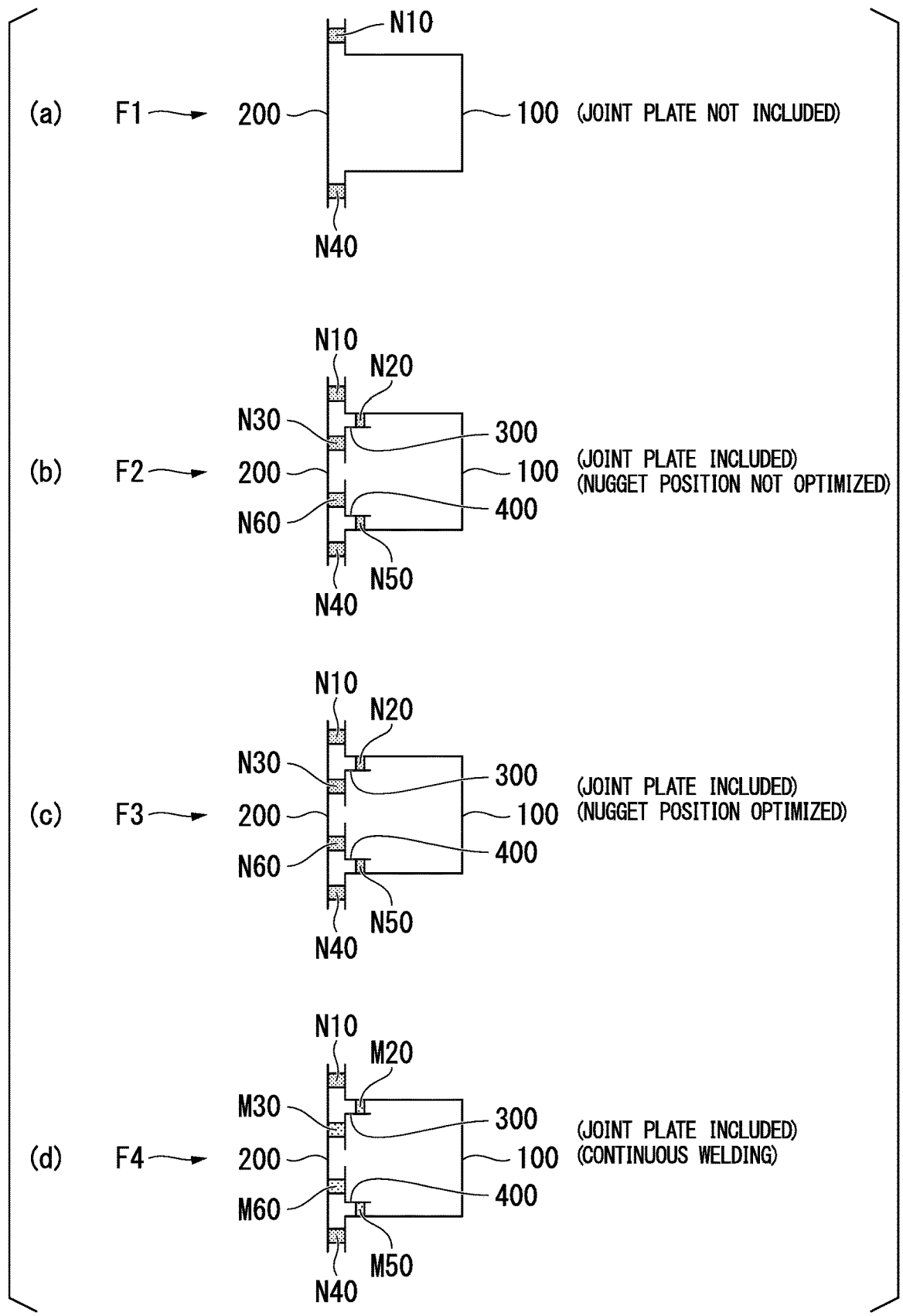
FIG. 23 is a schematic view of configurations of four kinds of frontside members F1 to F4 prepared to inspect the impact absorption performance of the frontside member.

In regard to each of the analysis conditions shown in FIGS. 21(a) to 21(h), the presence or absence of a spot fracture in a case where axial collapse distortion occurred due to a collision of the rigid body 700 within a range of 150 mm along the longitudinal direction X of the side sills E1 to E5 was investigated, and the impact energy absorption amount EA (kJ) with respect to axial collapse distortion was analyzed. Table 1 shows the test result of the presence or absence of a spot fracture. FIG. 22 is a graph showing an analysis result of the impact energy absorption amount EA (kJ) with respect to axial collapse distortion. The analysis conditions of (a) to (h) in FIG. 21 respectively correspond to the conditions a to h shown in FIG. 22 and Table 1.

TABLE 1

| | Symmetrical hat | | Asymmetrical hat | | | | | |
|---|---|---|---|---|---|---|---|---|
| | | | | | | f | g | h |
| | | | | | | | Joint plate included | |
| | a | b | c | d | e | Not optimized SP disposed state | Optimized SP disposed state | Continuous welding |
| Conditions | Joint plate not included | | Joint plate not included | | | | | |
| Presence or absence of spot fracture to impactor displacement 100 | None | None | None | None | Many | A few | None | None |

As shown in Table 1, in the analysis condition of FIG. 21(a), the rigid body 700 was caused to collide with the side sill E1 of Comparative Example 1 having a symmetrical hat structure in a parallel state (condition in which an impact load was input to the side sill outer panel 10 and the side sill inner panel 20 at the same time), but no spot fracture was generated. In addition, in the analysis condition of FIG. 21(b), the rigid body 700 was caused to collide with the side sill E1 of Comparative Example 1 having a symmetrical hat structure in a state of being inclined by 10° (condition in which an impact load was input first to the side sill outer panel 10), but no spot fracture was generated.

In this way, in the case of the side sill E1 of Comparative Example 1 having a symmetrical hat structure, it was checked that even if the first joint plate 30 and the second joint plate 40 were absent, no spot fracture was generated and a decrease of the collision energy absorption amount with respect to axial collapse distortion could be limited. However, as described above, in the case of the side sill E1 of Comparative Example 1 having a symmetrical hat structure, since the impact energy absorption amount with respect to three-point bending distortion decreased, it was not possible to satisfy the condition required to the side sill, that is, enhancement of the impact energy absorption amount with respect to two different distortion modes, such as axial collapse distortion and three-point bending distortion.

In the analysis condition of FIG. 21(c), the rigid body 700 was caused to collide with the side sill E2 of Comparative Example 2 having an asymmetrical hat structure in a parallel state (condition in which an impact load was input to the side sill outer panel 10 and the side sill inner panel 20 at the same time), but no spot fracture was generated. In the analysis condition of FIG. 21(d), the rigid body 700 was caused to collide with the side sill E2 of Comparative Example 2 having an asymmetrical hat structure in a state of being inclined by 10° (condition in which an impact load was input first to the side sill inner panel 20), but no spot fracture was generated. In the analysis condition of FIG. 21(e), the rigid body 700 was caused to collide with the side sill E2 of Comparative Example 2 having an asymmetrical hat structure in a state of being inclined by 10° (condition in which an impact load was input first to the side sill outer panel 10), and many spot fractures were generated.

In this way, in the case of the side sill E2 of Comparative Example 2 having an asymmetrical hat structure, under the condition in which an impact load was input to the side sill outer panel 10 and the side sill inner panel 20 at the same time (first impact input condition) or the condition in which an impact load was input first to the side sill inner panel 20 (second impact input condition), it was checked that even if the first joint plate 30 and the second joint plate 40 were absent, no spot fracture was generated and a decrease of the collision energy absorption amount with respect to axial collapse distortion could be limited. However, in the case of the side sill E2 of Comparative Example 2 having an asymmetrical hat structure, under the condition in which an impact load was input first to the side sill outer panel 10 (third impact input condition), many spot fractures were generated. As a result, it was checked that the collision energy absorption amount with respect to axial collapse distortion significantly decreased.

As the reason for such an analysis result, it was assumed that under the third impact input condition in which an impact load was input first to the side sill outer panel 10 having a large width, compared to the first and second impact input conditions, a significant shear force acted on the flange border surfaces (the border surface BS1 between the first flanges 14 and 24 and the border surface BS4 between the second flanges 15 and 25), so that spot fractures were generated in order closer to the input end of the impact load (fractures of the first melted and solidified portion N1 and the fourth melted and solidified portion N4).

In this way, under the first impact input condition and the second impact input condition, the side sill E2 of Comparative Example 2 having an asymmetrical hat structure satisfied the condition required to the side sill, that is, enhancement of the impact energy absorption amount with respect to two different distortion modes, such as axial collapse distortion and three-point bending distortion. However, under the third impact input condition, the requirement of enhancing the impact energy absorption amount with respect to axial collapse distortion could not satisfied.

In the analysis condition of FIG. 21(f), when the rigid body 700 was caused to collide with the side sill E3 of Example 1 of the invention having an asymmetrical hat structure in a state of being inclined by 10° (third impact input condition in which an impact load was input first to the side sill outer panel 10), although the number of generated spot fractures was not zero, compared to a case where an impact load was input to the side sill E2 of Comparative Example 2 under the third impact input condition, the number of generated spot fractures could be significantly reduced, and the impact energy absorption amount with respect to axial collapse distortion could also be improved.

In this way, in the case of the side sill E3 of Example 1 of the invention having an asymmetrical hat structure and having the first joint plate 30 and the second joint plate 40, it was checked that even under the third impact input condition in which an impact load was input first to the side sill outer panel 10, generation of a spot fracture could be limited, so that a decrease of the impact energy absorption amount with respect to axial collapse distortion could be limited as a result thereof.

As the reason for such an analysis result, it was assumed that in the side sill E3 of Example 1 of the invention, since the first joint plate 30 was joined to the first wall portions 12 and 22 such that the border line between the first flange 14 and the first flange 24 was covered and the second joint plate 40 was joined to the second wall portions 13 and 23 such that the border line between the second flange 15 and the second flange 25 was covered, even if an impact load entailing axial collapse distortion was input first to the side sill outer panel 10, a shear force acting on the flange border surfaces (BS1 and BS4) could be reduced.

In the analysis condition of FIG. 21(g), the rigid body 700 was caused to collide with the side sill E4 of Example 2 of the invention having an asymmetrical hat structure under the third impact input condition, but no spot fracture was generated. In the analysis condition of FIG. 21(h), the rigid body 700 was caused to collide with the side sill E5 of Example 3 of the invention having an asymmetrical hat structure under the third impact input condition, but no spot fracture was generated.

In this way, in the cases of the side sill E4 of Example 2 of the invention and the side sill E5 of Example 3 of the invention, it was checked that even under the third impact input condition in which an impact load was input first to the side sill outer panel 10, no spot fracture was generated, and compared to the side sill E3 of Example 1 of the invention, the impact energy absorption amount with respect to axial collapse distortion could be improved.

As described above, according to the side sills E3 to E5 of Examples 1 to 3 of the invention, regardless of the input condition of an impact load, generation of a spot fracture could be limited, and it was possible to limit a decrease of the impact energy absorption amount with respect to axial collapse distortion. Therefore, according to the side sills E3 to E5 of Examples 1 to 3 of the invention, it was possible to satisfy the condition required to the side sill, that is, enhancement of the impact energy absorption amount with respect to two different distortion modes, such as axial collapse distortion and three-point bending distortion.

(3) Investigation of Nugget Position (SP Position) and Presence or Absence of Spot Fracture Subsequently, a relationship between positions of the melted and solidified portions N2, N3, N5, and N6 in the longitudinal direction X of the side sill 1 (SP positions of the joint plates) and a spot fracture was investigated in more detail. As an example, eight kinds of the side sills E4, in which the positions of the melted and solidified portions were varied, were manufactured, and the presence or absence of a spot fracture in a case where axial collapse distortion occurred under the analysis condition of FIG. 21(g) was investigated.

Specifically, eight kinds of the side sills E4 were manufactured such that in the longitudinal direction of the side sill E4, the distance (mm) from a perpendicular line passing through the middle point P0 between two melted and solidified portions N1 (refer to FIG. 2A) to the central position between the melted and solidified portions N2 and N3, and the distance (mm) from a perpendicular line passing through the middle point P0' between two melted and solidified portions N4 (refer to FIG. 2B) to the central position between the melted and solidified portions N5 and N6 respectively became the values shown in Table 2 below. In the side sills E4, the melted and solidified portions N2 and N3 were disposed in the region D1 shown in FIG. 2A and the melted and solidified portions N5 and N6 were disposed in the region D2 shown in FIG. 2B. In each of the side sills E4, the presence or absence of a spot fracture in a case where axial collapse distortion occurred under the analysis condition of FIG. 21(g) was investigated.

As shown in Table 2, in the side sills E4, no spot fracture was generated. On the other hand, as shown in Table 1, in a case where the SP position was not optimized, the number of generated spot fractures was not zero (refer to the condition f in Table 1). Therefore, it could be checked that a spot fracture could be further limited by disposing the melted and solidified portions N2, N3, N5, and N6 in the regions D1 and D2.

TABLE 2

| | Sp positions of joint plate (distance (mm) from middle point between SPs of flanges) | | | | | | |
|---|---|---|---|---|---|---|---|
| | 0 | 4 | 8 | 12 | 13 | 14 | 15 | 16 |
| Presence or absence of spot fracture to impactor displacement 100 | None | | | | | | | |

[Inspection of Impact Absorption Performance of Frontside Member]

In order to inspect the impact absorption performance of the frontside members, four kinds of frontside members F1 to F4 shown in FIGS. 23(a) to 23(d) were prepared. In FIG. 23, for convenience of description, the reference sign used in the descriptions of the third and fourth embodiments was applied to each of the constituent elements of the frontside members F1 to F4.

The frontside member F1 shown in FIG. 23(a) was a frontside member prepared for Comparative Example 1. The frontside member F1 was a frontside member realized by removing the first joint plate 300 and the second joint plate 400 from the frontside member 3 of the third embodiment.

The frontside member F2 shown in FIG. 23(b) was a frontside member prepared for Example 1 of the invention. The frontside member F2 was a frontside member having the same structure as that of the frontside member 3 of the third embodiment, that is, a frontside member having the first joint plate 300 and the second joint plate 400 which were spot-welded to the side member inner panel 100 and the closing plate 200.

However, in the frontside member F2, the positions of the second melted and solidified portion N20 and the third melted and solidified portion N30 in the longitudinal direction X coincided with the position of the first melted and solidified portion N10 in the longitudinal direction X. In addition, the positions of the fifth melted and solidified portion N50 and the sixth melted and solidified portion N60 in the longitudinal direction X coincided with the position of the fourth melted and solidified portion N40 in the longitudinal direction X. For convenience, such a disposed state of the melted and solidified portion will be referred to as "not optimized".

The frontside member F3 shown in FIG. 23(c) was a frontside member prepared for Example 2 of the invention. The frontside member F3 was a frontside member having the same structure as that of the frontside member 3 of the third embodiment, that is, a frontside member having the first joint plate 300 and the second joint plate 400 which were spot-welded to the side member inner panel 100 and the closing plate 200.

However, in the frontside member F3, the positions of the second melted and solidified portion N20 and the third melted and solidified portion N30 in the longitudinal direction X coincided with the position of the middle point P0 in the longitudinal direction X (refer to FIG. 12A). In addition, the positions of the fifth melted and solidified portion N50 and the sixth melted and solidified portion N60 in the longitudinal direction X coincided with the position of the middle point P0' in the longitudinal direction X (refer to FIG. 12B). That is, in the frontside member F3, the second melted and solidified portion N20 and the third melted and solidified portion N30 were disposed in the region D3 shown in FIG. 12A, and the fifth melted and solidified portion N50 and the sixth melted and solidified portion N60 were disposed in the region D4 shown in FIG. 12B. For convenience, such a state will be referred to as "optimized".

The frontside member F4 shown in FIG. 23(d) was a frontside member prepared for Example 3 of the invention. The frontside member F4 was a frontside member having the same structure as that of the frontside member 4 of the fourth embodiment, that is, a frontside member having the first joint plate 300 and the second joint plate 400 which were continuously welded to the side member inner panel 100 and the closing plate 200.

In the frontside members F1 to F4, as the side member inner panel 100, steel sheets press-formed into a hat shape having the sheet thickness of 1.4 mm, the tensile strength of 980 MPa, and the overall length of 350 mm were used. In addition, in the frontside members F1 to F4, as the closing plate 200, flat steel sheets having the sheet thickness of 1.4 mm, the tensile strength of 980 MPa, and the overall length of 350 mm were used. In addition, in the frontside members F2 to F4, as the first joint plate 300 and the second joint plate 400, steel sheets press-formed into an L-shape having the sheet thickness of 1.4 mm, the tensile strength of 980 MPa, and the overall length of 350 mm were used.

When the frontside members F1 to F4 were manufactured, spot welding was performed such that the first melted and solidified portion N10 and the fourth melted and solidified portion N40 were formed at an interval of 40 mm along the longitudinal direction X (such that Lf1 and Lf2 shown in FIGS. 12A and 12B became 40 mm) on the flange border surface. In addition, the condition for spot welding was set for the frontside members F1 to F4 such that the nugget diameters of the melted and solidified portions (N10 to N60) formed through spot welding became 4√t (t: sheet thickness). In addition, the condition for laser welding was set for the frontside member F4 such that the lengths of the melted and solidified portions (M20, M30, M40, and M50) continuously formed through laser welding became 350 mm.

Then, a numerical analysis test for the impact energy absorption amount with respect to axial collapse distortion was performed by using the frontside members F1 to F4. Specifically, after one end portion of each of the frontside members F1 to F4 in the longitudinal direction was fixed, a flat sheet-shaped rigid body 800 in a parallel state of a state of being inclined by 10° was caused to collide with the other end portion of each of the frontside members F1 to F4 in the longitudinal direction. The collision speed of the rigid body 800 with respect to the frontside members F1 to F4 was set to 20 km/h.

In regard to each of the analysis conditions shown in FIGS. 24(a) to 24(f), the presence or absence of a spot fracture in a case where axial collapse distortion occurred due to a collision of the rigid body 800 within a range of 150 mm along the longitudinal direction X of the frontside members F1 to F4 was investigated, and the impact energy absorption amount EA (kJ) with respect to axial collapse distortion was analyzed. Table 3 shows the test result of the presence or absence of a spot fracture. FIG. 25 is a graph showing an analysis result of the impact energy absorption amount EA (kJ) with respect to axial collapse distortion.

TABLE 3

|  | One-side hat + closing plate | | | | | |
| --- | --- | --- | --- | --- | --- | --- |
|  | a | b | c | d | e | f |
|  |  |  |  | Joint plate included | | |
| Conditions |  | Joint plate not included | | Not optimized SP disposed state | Optimized SP disposed state | Continuous welding |
| Presence or absence of spot fracture to impactor displacement 100 | None | None | Many | A few | None | None |

Figure 24:
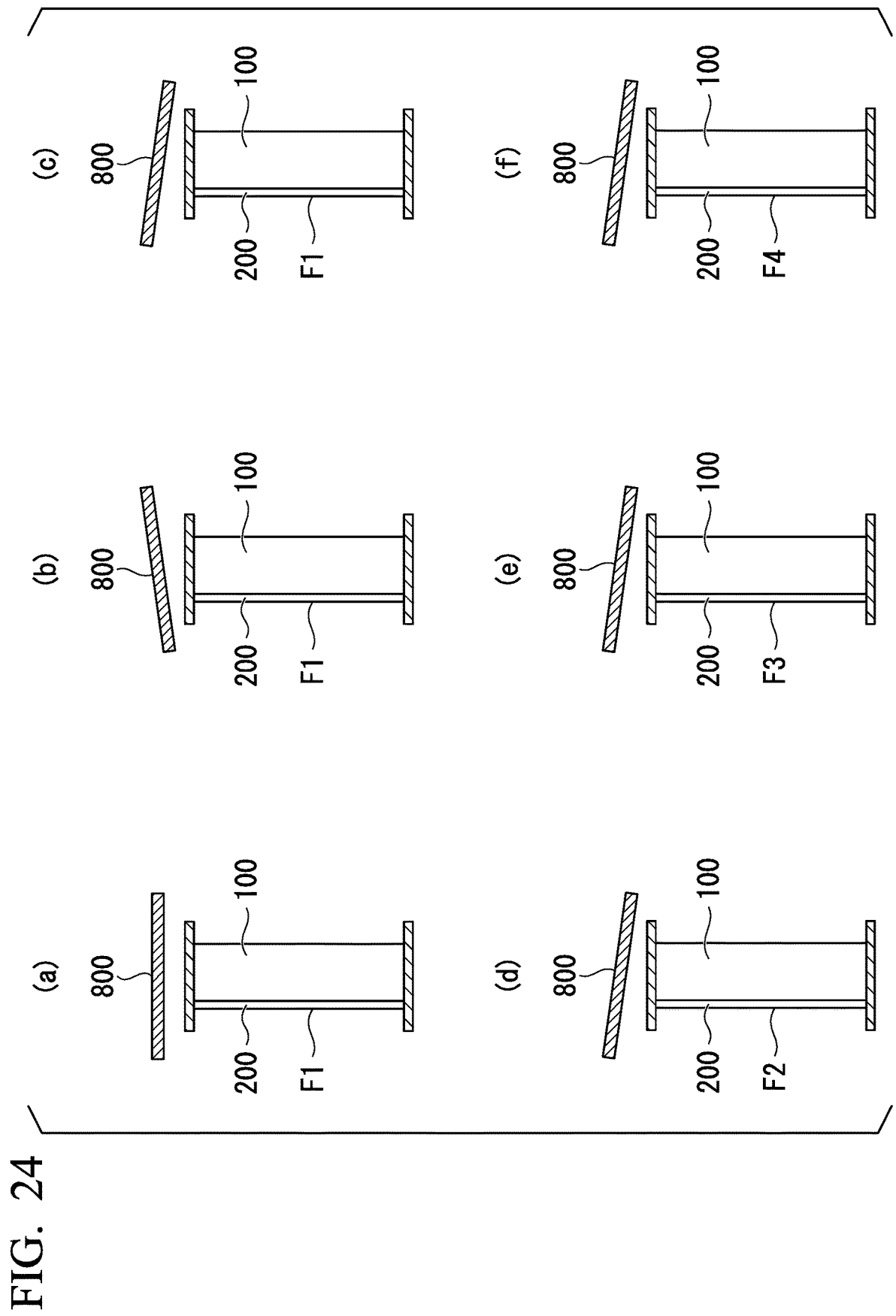
FIG. 24 is a schematic view showing various conditions for analyzing the impact energy absorption amounts of the frontside members with respect to axial collapse distortion.
Figure 25:
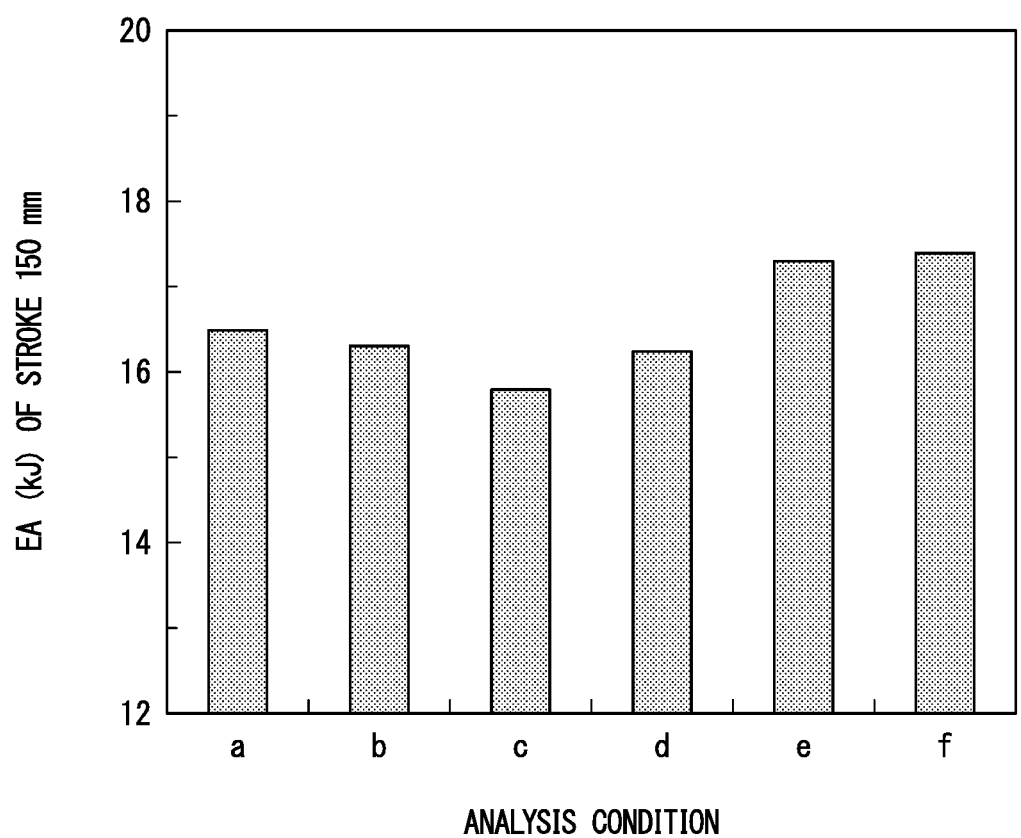
FIG. 25 is a graph showing an analysis result of the impact energy absorption amount EA (kJ) when axial collapse distortion is caused in the frontside members of Comparative Examples and Examples of the invention.

As shown in Table 3, in the analysis condition of FIG. 24(a), the rigid body 800 was caused to collide with the frontside member F1 of Comparative Example 1 in a parallel state (condition in which an impact load was input to the side member inner panel 100 and the closing plate 200 at the same time), but no spot fracture was generated. In the analysis condition of FIG. 24(b), the rigid body 800 was caused to collide with the frontside member F1 of Comparative Example 1 in a state of being inclined by 10° (condition in which an impact load was input first to the closing plate 200), but no spot fracture was generated. In the analysis condition of FIG. 24(c), the rigid body 800 was caused to collide with the frontside member F1 of Comparative Example 1 in a state of being inclined by 10° (condition in which an impact load was input first to the side member inner panel 100), and many spot fractures were generated.

In this way, in the case of the frontside member F1 of Comparative Example 1, it was checked that even if the first joint plate 300 and the second joint plate 400 were absent, no spot fracture was generated and a decrease of the collision energy absorption amount with respect to axial collapse distortion could be limited under the condition in which an impact load was input to the side member inner panel 100 and the closing plate 200 at the same time (first impact input condition) or an impact load was input first to the closing plate 200 (second impact input condition). However, in the case of the frontside member F1 of Comparative Example 1, under the condition in which an impact load was input first to the side member inner panel 100 (third impact input condition), many spot fractures were generated. As a result, it was checked that the collision energy absorption amount with respect to axial collapse distortion significantly decreased.

As the reason for such an analysis result, it was assumed that under the third impact input condition in which an impact load was input first to the side member inner panel 100 having a large width, compared to the first and second impact input conditions, a significant shear force acted on the flange border surfaces (the border surface BS10 between the first flange 140 and the first flange joint portion 210 and the border surface BS40 between the second flange 150 and the second flange joint portion 220), so that spot fractures were generated in order from the input end of the impact load due to the shear force (fractures of the first melted and solidified portion N10 and the fourth melted and solidified portion N40).

In the frontside member F1 of Comparative Example 1 which does not include the first joint plate 300 and the second joint plate 400, under the first impact input condition and the second impact input condition, it was possible to enhance the impact energy absorption amount with respect to axial collapse distortion. However, under the third impact input condition, it was not possible to enhance the impact energy absorption amount with respect to axial collapse distortion.

In the analysis condition of FIG. 24(d), when the rigid body 800 was caused to collide with the frontside member F2 of Example 1 of the invention in a state of being inclined by 10° (third impact input condition in which an impact load was input first to the side member inner panel 100), although the number of generated spot fractures was not zero, compared to a case where an impact load was input to the frontside member F1 of Comparative Example 1 under the third impact input condition, the number of generated spot fractures could be significantly reduced, and the impact energy absorption amount with respect to axial collapse distortion could also be improved.

In this way, in the case of the frontside member F2 of Example 1 of the invention including the first joint plate 300 and the second joint plate 400, it was checked that even under the third impact input condition in which an impact load was input first to the side member inner panel 100, generation of a spot fracture could be limited, so that a decrease of the impact energy absorption amount with respect to axial collapse distortion could be limited as a result thereof.

As the reason for such an analysis result, it was assumed that in the frontside member F2 of Example 1 of the invention, since the first joint plate 300 was joined to the first wall portion 120 and the central joint portion 230 such that the border line between the first flange 140 and the first flange joint portion 210 was covered and the second joint plate 400 was joined to the second wall portion 130 and the central joint portion 230 such that the border line between the second flange 150 and the second flange joint portion 220 was covered, even if an impact load entailing axial collapse distortion was input first to the side member inner panel 100, a shear force acting on the flange border surfaces (BS10 and BS40) could be reduced.

In the analysis condition of FIG. 24(e), the rigid body 800 was caused to collide with the frontside member F3 of Example 2 of the invention under the third impact input condition, but no spot fracture was generated. In the analysis condition shown in FIG. 24(f), the rigid body 800 was caused to collide with the frontside member F4 of Example 3 of the invention under the third impact input condition, but no spot fracture was generated.

In this way, in the frontside member F3 of Example 2 of the invention and the frontside member F4 of Example 3 of the invention, it was checked that even under the third impact input condition in which an impact load was input first to the side member inner panel 100, no spot fracture was generated, and compared to the frontside member F2 of Example 1 of the invention, the impact energy absorption amount with respect to axial collapse distortion could be improved.

As described above, according to the frontside members F2 to F4 of Examples 1 to 3 of the invention, regardless of the input condition of an impact load, generation of a spot fracture could be limited, and it was possible to limit a decrease of the impact energy absorption amount with respect to axial collapse distortion.

Hereinabove, the first to fourth embodiments of the present invention, the modification examples, and Examples have been described. However, the present invention is not limited thereto only. The embodiments and the modification examples can be realized in various other forms, and various omissions, replacements, and changes can be made within a range not departing from the gist of the invention. The embodiments and the modification examples are included in the invention disclosed in Claims and the scope equivalent thereto, as are included in the scope and the gist of the invention.

For example, in the first embodiment, the side sill 1 having a structure in which the first joint plate 30 is spot-welded to the first wall portion 12 of the side sill outer panel 10 and the first wall portion 22 of the side sill inner panel 20, and the second joint plate 40 is spot-welded to the second wall portion 13 of the side sill outer panel 10 and the second wall portion 23 of the side sill inner panel 20 has been exemplified.

On the other hand, a structure in which the first joint plate 30 is spot-welded to the first wall portion 12 of the side sill outer panel 10 and the first wall portion 22 of the side sill inner panel 20, and the second joint plate 40 is continuously welded to the second wall portion 13 of the side sill outer panel 10 and the second wall portion 23 of the side sill inner panel 20 may be employed. That is, the joining structure described in the first embodiment (joining structure of spot welding) may be employed as the joining structure of the first joint plate 30, and the joining structure described in the second embodiment (joining structure of continuous welding) may be employed as the joining structure of the second joint plate 40.

In addition, for example, in the third embodiment, the frontside member 3 having a structure in which the first joint plate 300 is spot-welded to the first wall portion 120 of the side member inner panel 100 and the central joint portion 230 of the closing plate 200, and the second joint plate 400 is spot-welded to the second wall portion 130 of the side member inner panel 100 and the central joint portion 230 of the closing plate 200 has been exemplified.

On the other hand, a structure in which the first joint plate 300 is spot-welded to the first wall portion 120 of the side member inner panel 100 and the central joint portion 230 of the closing plate 200, and the second joint plate 400 is continuously welded to the second wall portion 130 of the side member inner panel 100 and the central joint portion 230 of the closing plate 200 may be employed. That is, the joining structure described in the third embodiment (joining structure of spot welding) may be employed as the joining structure of the first joint plate 300, and the joining structure described in the fourth embodiment (joining structure of continuous welding) may be employed as the joining structure of the second joint plate 400.

In addition, for example, the first embodiment has described a case where the first joint plate 30 has a rectangular shape. However, the first joint plate 30 may have a circular shape, an elliptic shape, or an oval shape.

In addition, for example, the first embodiment has described a case where one first joint plate 30 is provided. However, a plurality of first joint plates 30 may be provided.

In addition, for example, the second embodiment has described a case where the second melted and solidified portion M2 has a linear shape. However, the second melted and solidified portion M2 may have a curved shape or a waved shape.

In addition, for example, the first embodiment has described a case where the first flange 14 and the second flange 15 of the side sill outer panel 10 and the first flange 24 and the second flange 25 of the side sill inner panel 20 are outwardly-extending flanges facing the outer side of the side sill 1 in the width direction. However, for example, the first flanges 14 and 24 may be inwardly-extending flanges facing the inner side of the side sill 1 in the width direction. In this case, the first joint plate 30 may be joined to an outer wall surface of the first wall portion 12 of the side sill outer panel 10 and an outer wall surface of the first wall portion 22 of the side sill inner panel 20.

BRIEF DESCRIPTION OF THE REFERENCE SYMBOLS 1, 2: side sill (automobile member)
3, 4: frontside member (automobile member)
10: side sill outer panel (first member)
20: side sill inner panel (second member)
30: first joint plate (first joining plate)
40: second joint plate (second joining plate)
11, 21: web
12, 22: first wall portion
13, 23: second wall portion
14, 24: first flange
15, 25: second flange
100: side member inner panel (first member)
200: closing plate (second member)
300: first joint plate (first joining plate)
400: second joint plate (second joining plate)
110: web
120: first wall portion
130: second wall portion
140: first flange
150: second flange
210: first flange joint portion
220: second flange joint portion
230: central joint portion
N1, N10: first melted and solidified portion
N2, M2, N20, M20: second melted and solidified portion
N3, M3, N30, M30: third melted and solidified portion
N4, N40: fourth melted and solidified portion
N5, M5, N50, M50: fifth melted and solidified portion
N6, M6, N60, M60: sixth melted and solidified portion

The invention claimed is:

1. An automobile member which is long in one direction and of which a cross section perpendicular to a longitudinal direction is a hollow cross section, the automobile member comprising:
   a hat-shaped first member that has a first flange, a second flange, a first wall portion erected from the first flange, a second wall portion erected from the second flange, and a web connecting the first wall portion and the second wall portion to each other;
   a second member that is spot-joined to the first flange and the second flange;
   a first joining plate that is joined to an inner wall surface of the first wall portion and an inner wall surface of the second member; and
   a second joining plate that is joined to an inner wall surface of the second wall portion and an inner wall surface of the second member;
   wherein the first flange and the second member are joined to each other via a plurality of first melted and solidified portions formed along the longitudinal direction,
   wherein the first joining plate and the inner wall surface of the first wall portion are joined to each other via a second melted and solidified portion,
   wherein the first joining plate and the inner wall surface of the second member are joined to each other via a third melted and solidified portion, and
   wherein at least a part of the second melted and solidified portion and at least a part of the third melted and solidified portion are positioned in a region between two first melted and solidified portions adjacent to each other in the longitudinal direction.

2. The automobile member according to claim 1, wherein the second melted and solidified portion and the third melted and solidified portion are formed in a spot shape.

3. The automobile member according to claim 2, wherein in the longitudinal direction, a position of the second melted and solidified portion and a position of the third melted and solidified portion are the same as each other.

4. The automobile member according to claim 3, wherein when the shortest distance between two first melted and solidified portions adjacent to each other in the longitudinal direction is Lf1, the second melted and solidified portion and the third melted and solidified portion are disposed in a region between a position separated from a middle point between the two first melted and solidified portions adjacent to each other to one side in the longitudinal direction by $0.8 \times Lf1/2$ and a position separated from the middle point to the other side in the longitudinal direction by $0.8 \times Lf1/2$.

5. The automobile member according to claim 1, wherein the second melted and solidified portion and the third melted and solidified portion are formed in a bead shape.

6. The automobile member according to claim 1, wherein the second flange and the second member are joined to each other via a plurality of fourth melted and solidified portions formed along the longitudinal direction,
   wherein the second joining plate and the inner wall surface of the second wall portion are joined to each other via a fifth melted and solidified portion,
   wherein the second joining plate and the inner wall surface of the second member are joined to each other via a sixth melted and solidified portion, and
   wherein at least a part of the fifth melted and solidified portion and at least a part of the sixth melted and solidified portion are positioned in a region between two fourth melted and solidified portions adjacent to each other in the longitudinal direction.

7. The automobile member according to claim 6, wherein in the longitudinal direction, a position of the fifth melted and solidified portion and a position of the sixth melted and solidified portion are the same as each other.

8. The automobile member according to claim 7,
wherein when the shortest distance between two fourth melted and solidified portions adjacent to each other in the longitudinal direction is Lf2, the fifth melted and solidified portion and the sixth melted and solidified portion are disposed in a region between a position separated from a middle point between the two fourth melted and solidified portions adjacent to each other to one side in the longitudinal direction by 0.8×Lf2/2 and a position separated from the middle point to the other side in the longitudinal direction by 0.8×Lf2/2.

9. The automobile member according to claim 6,
wherein the fifth melted and solidified portion and the sixth melted and solidified portion are formed in a bead shape.

10. The automobile member according to claim 1,
wherein the second member is a hat-shaped member having a first flange, a second flange, a first wall portion erected from the first flange, a second wall portion erected from the second flange, and a web connecting the first wall portion and the second wall portion to each other,
wherein the first flange of the first member and the first flange of the second member are spot-joined to each other, and the second flange of the first member and the second flange of the second member are spot-joined to each other,
wherein a width WL (mm) of the first wall portion of the first member and a width WS (mm) of the first wall portion of the second member satisfy the following Expression (1),
wherein the first joining plate is joined to the first wall portion of the first member and the first wall portion of the second member, and
wherein the second joining plate is joined to the second wall portion of the first member and the second wall portion of the second member, $$0 < WS/WL < 0.8 \qquad \text{Expression (1).}$$

11. The automobile member according to claim 1,
wherein the second member is a rectangular flat sheet extending in the longitudinal direction and is divided into a first flange joint portion, a second flange joint portion, and a central joint portion between the first flange joint portion and the second flange joint portion along a width direction of the second member,
wherein the first flange joint portion of the second member and the first flange of the first member are spot-joined to each other, and the second flange joint portion of the second member and the second flange of the first member are spot-joined to each other,
wherein the first joining plate is a sheet material having an L-shaped cross section and is joined to the first wall portion of the first member and the central joint portion of the second member, and
wherein the second joining plate is a sheet material having an L-shaped cross section and is joined to the second wall portion of the first member and the central joint portion of the second member.

12. The automobile member according to claim 1,
wherein the first joining plate and the second joining plate extend from one end portion toward the other end portion of the automobile member in the longitudinal direction over a length ranging from 100 mm to 600 mm.

* * * * *